（12）United States Patent
Barker et al.

(10) Patent No.: US 10,717,660 B2
(45) Date of Patent: *Jul. 21, 2020

(54) VESSEL FOR REMOVING RADIONUCLIDES FROM A LIQUID

(71) Applicant: AVANTech, Inc., Columbia, SC (US)

(72) Inventors: Tracy A. Barker, Columbia, SC (US); James L. Braun, Blythewood, SC (US)

(73) Assignee: AVANTech, Inc., Columbia, SC (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/899,150

(22) Filed: Feb. 19, 2018

(65) Prior Publication Data

US 2018/0186662 A1  Jul. 5, 2018

Related U.S. Application Data

(63) Continuation of application No. 14/153,291, filed on Jan. 13, 2014, now Pat. No. 9,896,352.

(Continued)

(51) Int. Cl.
*C02F 1/42* (2006.01)
*G21F 9/12* (2006.01)
(Continued)

(52) U.S. Cl.
CPC ............. *C02F 1/42* (2013.01); *B01J 47/022* (2013.01); *G21F 9/06* (2013.01); *G21F 9/12* (2013.01);
(Continued)

(58) Field of Classification Search
CPC ...... C02F 1/42; C02F 2101/006; G21F 1/125; G21F 5/002; G21F 5/005; G21F 5/10;
(Continued)

(56) References Cited

U.S. PATENT DOCUMENTS 2,355,815 A    8/1944  McGill
2,918,700 A   12/1959  Hatch
(Continued)

FOREIGN PATENT DOCUMENTS

CH    517667 A    1/1972
CN   1169791 A    1/1998
(Continued)

OTHER PUBLICATIONS

First Office Action dated Sep. 23, 2016 in corresponding Chinese patent application serial No. 201480025020.2, all enclosed pages cited.

(Continued)

*Primary Examiner* — Matthew O Savage
(74) *Attorney, Agent, or Firm* — Nelson Mullins Riley & Scarborough, LLP

(57) ABSTRACT

A vessel for removing radionuclides from a liquid. The vessel comprises a shielded housing comprising an outer shell and an inner shell disposed within the outer shell. The housing defines an ion exchange chamber between the inner and outer shells. The vessel also comprises an inlet fluidly coupled with the ion exchange chamber, the inlet being configured for fluid communication with a source of the liquid, and an outlet fluidly coupled with the ion exchange chamber, the outlet being configured for fluid communication with a destination of the liquid. The vessel further comprises a first fluid passage extending between an exterior of the vessel and the inner shell and a second fluid passage extending between the exterior of the vessel and the inner shell.

16 Claims, 15 Drawing Sheets

Related U.S. Application Data

(60) Provisional application No. 61/788,230, filed on Mar. 15, 2013.

(51) Int. Cl.

| | | |
|---|---|---|
| *G21F 9/06* | (2006.01) | |
| *B01J 47/022* | (2017.01) | |
| *G21F 5/002* | (2006.01) | |
| *G21F 5/10* | (2006.01) | |
| *G21F 1/12* | (2006.01) | |
| *G21F 5/14* | (2006.01) | |
| *G21F 5/005* | (2006.01) | |
| *C02F 1/44* | (2006.01) | |
| *C02F 101/00* | (2006.01) | |
| *B01J 47/012* | (2017.01) | |

(52) U.S. Cl.
CPC ............. *B01J 47/012* (2017.01); *C02F 1/444* (2013.01); *C02F 2101/006* (2013.01); *C02F 2209/11* (2013.01); *G21F 1/125* (2013.01); *G21F 5/002* (2013.01); *G21F 5/005* (2013.01); *G21F 5/10* (2013.01); *G21F 5/14* (2013.01)

(58) Field of Classification Search
CPC ... G21F 9/12; G21F 5/14; B01J 47/012; B01J 47/022; B01J 47/14
See application file for complete search history.

(56) References Cited

U.S. PATENT DOCUMENTS

| | | |
|---|---|---|
| 3,111,586 A | 11/1963 | Rogers |
| 3,483,381 A | 12/1969 | Bonilla et al. |
| 3,626,191 A | 12/1971 | Pierlas et al. |
| 3,730,349 A | 5/1973 | Herrmann |
| 4,107,044 A | 8/1978 | Levendusky |
| 4,436,655 A | 3/1984 | Masotto et al. |
| 4,533,832 A | 8/1985 | Jacobson |
| 4,894,550 A | 1/1990 | Baatz et al. |
| 5,132,076 A | 7/1992 | Corpora et al. |
| 5,250,187 A | 10/1993 | Franks |
| 5,948,259 A | 9/1999 | Deguitre et al. |
| 6,387,274 B1 | 5/2002 | Hendricks et al. |
| 7,926,666 B2 | 4/2011 | Herman et al. |
| 9,218,897 B1 | 12/2015 | Braun |
| 9,896,351 B2 | 2/2018 | Barker et al. |
| 9,896,352 B2 | 2/2018 | Barker et al. |
| 2005/0236333 A1 | 10/2005 | Williams et al. |
| 2012/0037632 A1 | 2/2012 | Singh et al. |
| 2013/0161260 A1 | 6/2013 | Ferguson et al. |

FOREIGN PATENT DOCUMENTS

| | | |
|---|---|---|
| CN | 1173946 A | 2/1998 |
| CN | 102201270 A | 9/2011 |
| DE | 2313786 A1 | 9/1974 |
| JP | S58-140696 A | 8/1983 |
| WO | 2002065478 A1 | 8/2002 |
| WO | 2013085644 A1 | 6/2013 |

OTHER PUBLICATIONS

Second Office Action dated Jul. 4, 2017 in corresponding Chinese patent application serial No. 201480025020.2, all enclosed pages cited.
International Preliminary Report on Patentability for counterpart application PCT/US2014/025322 dated Sep. 15, 2015, all enclosed pages cited.
International Search Report and Written Opinion for counterpart application PCT/US2014/025322 dated Sep. 4, 2014, all enclosed pages cited.
U.S. Department of Energy, Small Column Ion Exchange Technology at Savannah River Site: Technology Readiness Report, Nov. 11, 2011, all enclosed pages cited.
Christophe A. Serra et al., A Comparison of Rotating and Stationary Membrane Disk Filters Using Computational Fluid Journal of Membrane Science 165 (2000), 19-29.
Office Action dated Feb. 7, 2018 in corresponding Japanese patent application serial No. 2016-501819, all enclosed pages cited.
Notice of Preliminary Rejection dated Dec. 19, 2019 in corresponding Korean patent application serial No. 10-2015-7029746, all enclosed pages cited.

VESSEL FOR REMOVING RADIONUCLIDES FROM A LIQUID

PRIORITY CLAIM

This application is a continuation of copending U.S. application Ser. No. 14/153,291, filed Jan. 13, 2014, which is based upon and claims the benefit of U.S. provisional application Ser. No. 61/788,230, filed Mar. 15, 2013. Both of the foregoing applications are incorporated fully herein by reference.

RELATED APPLICATION

This application is also related to U.S. patent application Ser. No. 14/153,277, filed on Jan. 13, 2014.

FIELD OF THE INVENTION

The present invention relates generally to treatment and disposal of radionuclides in liquids.

BACKGROUND OF THE INVENTION

As is well known, radioactive materials are used extensively in industrial, medical, agricultural, and environmental activities, among others. For example, radioactive waste is generated at nuclear facilities, and there are a number of liquid processes and waste streams at nuclear facilities that require treatment for removal of radioactive contaminants. Management of this waste typically includes treatment, temporary storage, and transportation of the waste to a permanent disposal site.

For example, the Savannah River Site (SRS) and the Hanford Site are nuclear reservations owned by the U.S. Department of Energy (DOE) and located in the states of South Carolina and Washington, respectively. The liquid waste operations contracts at these sites are respectively held by Savannah River Remediation (SRR) and Washington River Protection Solutions (WRPS), which are teams of companies led by the URS Corporation. A major focus of these contracts is cleanup activities related to work done in the past at these sites.

In particular, large, highly toxic quantities of high-level radioactive waste are located on the SRS and Hanford sites. At SRS, almost 40 million gallons of this waste, containing hundreds of millions of curies, is found in the form of sludge, salt, and liquid. Predominant radionuclides are plutonium, strontium-90, and cesium-137. Strontium and cesium account for more than 95% of the radioactivity. Large amounts of transuranic (TRU) waste are also stored on site. At Hanford, almost 60 million gallons of similar waste exists.

The current plan to deal with this waste is to first pretreat the waste via regenerable ion exchange at Hanford and liquid-liquid solvent extraction and non-regenerable ion exchange at SRS to remove various radionuclides. As is known, regenerable ion exchange and solvent extraction are effective for transferring the radioactive content of a large volume of liquid into a small volume of eluate and strip effluent, respectively, and non-regenerable ion exchange is effective for transferring the radioactive content of a large volume of liquid into a small volume of solid. Although ion exchange processes may be implemented in a variety of ways, the most common uses of ion exchange media are as packed beds in vessels. More particularly, an ion exchange medium is typically contained inside a stainless steel pressure vessel, with an engineered inlet, outlet, and flow distribution system to allow liquid to percolate uniformly through the bed of the medium at a specified flow rate. Many types of ion exchange media are available for this purpose, including inorganic and synthetic organic medias.

Secondary waste from the ion exchange or solvent extraction processes at Hanford at SRS is eventually mixed with precipitated solids and immobilized through a process called vitrification. Glass forming materials will be added to the waste at high temperature to form molten glass. The molten material will then be poured into stainless steel containers, where the glass will harden as it cools. The waste will still be radioactive, but no longer mobile (and thus not able to easily spread into the environment). At SRS, a vitrification facility called the Defense Waste Processing Facility (DWPF) has been operating for the past 15 years, with an operating expense of approximately one million dollars a day. During this time period, the waste volume and sludge volumes in the tanks have actually increased because of an insufficient capacity to treat liquid waste. At Hanford, a vitrification facility called the Waste Treatment Plant (WTP) has been under construction for the past eleven years but is not expected to begin operations until at least 2019 or beyond. Unfortunately, Hanford has multiple leaking tanks that require processing prior to the operation of the vitrification process.

SUMMARY

The present invention recognizes and addresses various considerations of prior art constructions and methods. In this regard, embodiments of the present invention provide a vessel for removing radionuclides from a liquid. The vessel comprises a shielded housing defining an ion exchange chamber therein, the ion exchange chamber configured to receive ion exchange media in its interior between an interior top surface and an interior bottom surface. An inlet diffuser is disposed in the ion exchange chamber proximate the bottom surface. An outlet collection header is disposed in the ion exchange chamber proximate the top surface. A process inlet is in fluid communication with the inlet diffuser. A process outlet is in fluid communication with the outlet collection header.

Another aspect of the present invention provides an assembly configured to be positioned near a storage tank containing radioactive liquid for removing radionuclides from the liquid. The assembly comprises a filter vessel having at least one filter and further having a plurality of ion exchange vessels. The ion exchange vessels each comprise a shielded housing having an outer shell and an inner shell disposed within the outer shell, the housing defining an ion exchange chamber between the inner and outer shells. A process inlet and a process outlet are each in fluid communication with the ion exchange chamber. A first fluid passage extends between an exterior of the vessel and the inner shell. A second fluid passage extends between the exterior of the vessel and the inner shell.

A still further aspect of the present invention provides a vessel for removing radionuclides from a liquid. The vessel comprises a shielded housing having an outer shell and an inner shell disposed within the outer shell, the housing defining an ion exchange chamber between the inner and outer shells. A base supporting the housing is also provided. A process inlet and a process outlet are each in fluid communication with the ion exchange chamber. A first fluid passage extends between an exterior of the vessel and the inner shell and a second fluid passage extends between the exterior of the vessel and the inner shell. The vessel thereby permits convective air flow between the first fluid passage, the inner shell, and the second fluid passage.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1A:
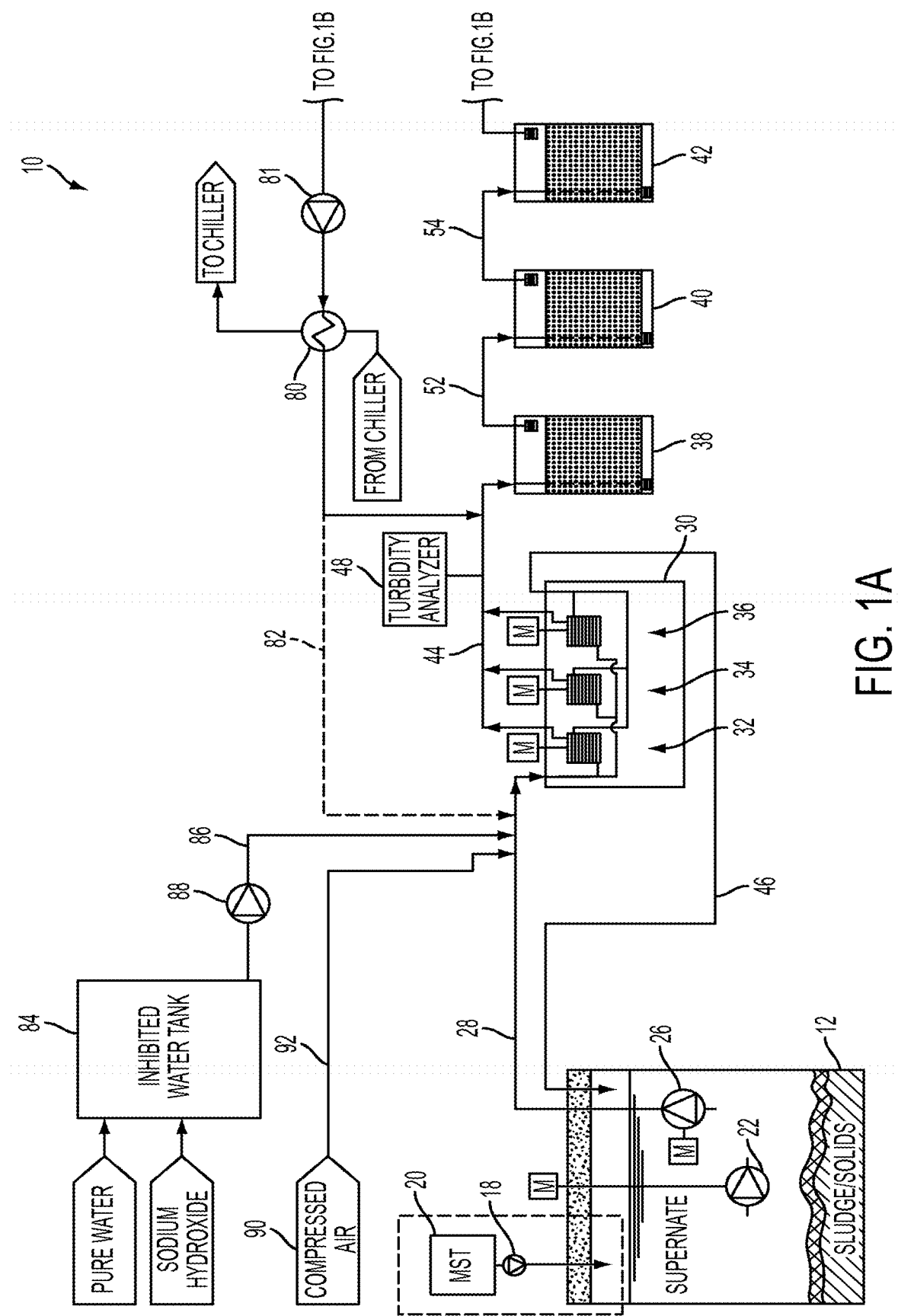
FIGS. 1A-1B are a schematic representation of an exemplary wastewater treatment system at a nuclear facility comprising a near-tank filtration and ion exchange assembly in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations.

Various systems and techniques of liquid treatment for removal of radioactive material in the liquid are shown and described in U.S. Pat. No. 6,387,274, entitled "System and Method for the Removal of Radioactive Particulate from Liquid Waste"; U.S. Pat. No. 9,218,897, entitled "Wastewater Treatment and Radioactive Material Disposal Container"; and International App. Pub. No. WO 2013/085644 (the '644 publication), entitled "Fluid Treatment System." The foregoing patent and patent applications are each incorporated herein by reference in their entireties for all purposes.

Embodiments of the present invention provide a liquid treatment system and a method for removing radionuclides from liquids. Some embodiments of the present invention are particularly suitable for use in processing radioactive wastewater streams at nuclear facilities, and the below discussion will describe preferred embodiments in that context. For example, embodiments of the present invention provide novel systems and methods that can be used to address various wastewater issues, including but not limited to the leaking tank issue at Hanford described above. However, those of skill in the art will understand that the present invention is not so limited. In fact, it is contemplated that embodiments of the present invention may be used with any liquid containing nuclear fission products and in industrial environments other than a nuclear facility.

As those familiar with the art will understand, there are many types of beaded and granular medias used for the selective removal of contaminants of such as radionuclides from aqueous liquids. As used herein, the term "ion exchange" refers to any and all processes that may occur within the present invention, such as but not limited to ion exchange, adsorption, coprecipitation, etc. Therefore, the term "ion exchange" contemplates multiple removal mechanisms.

Figure 1B:
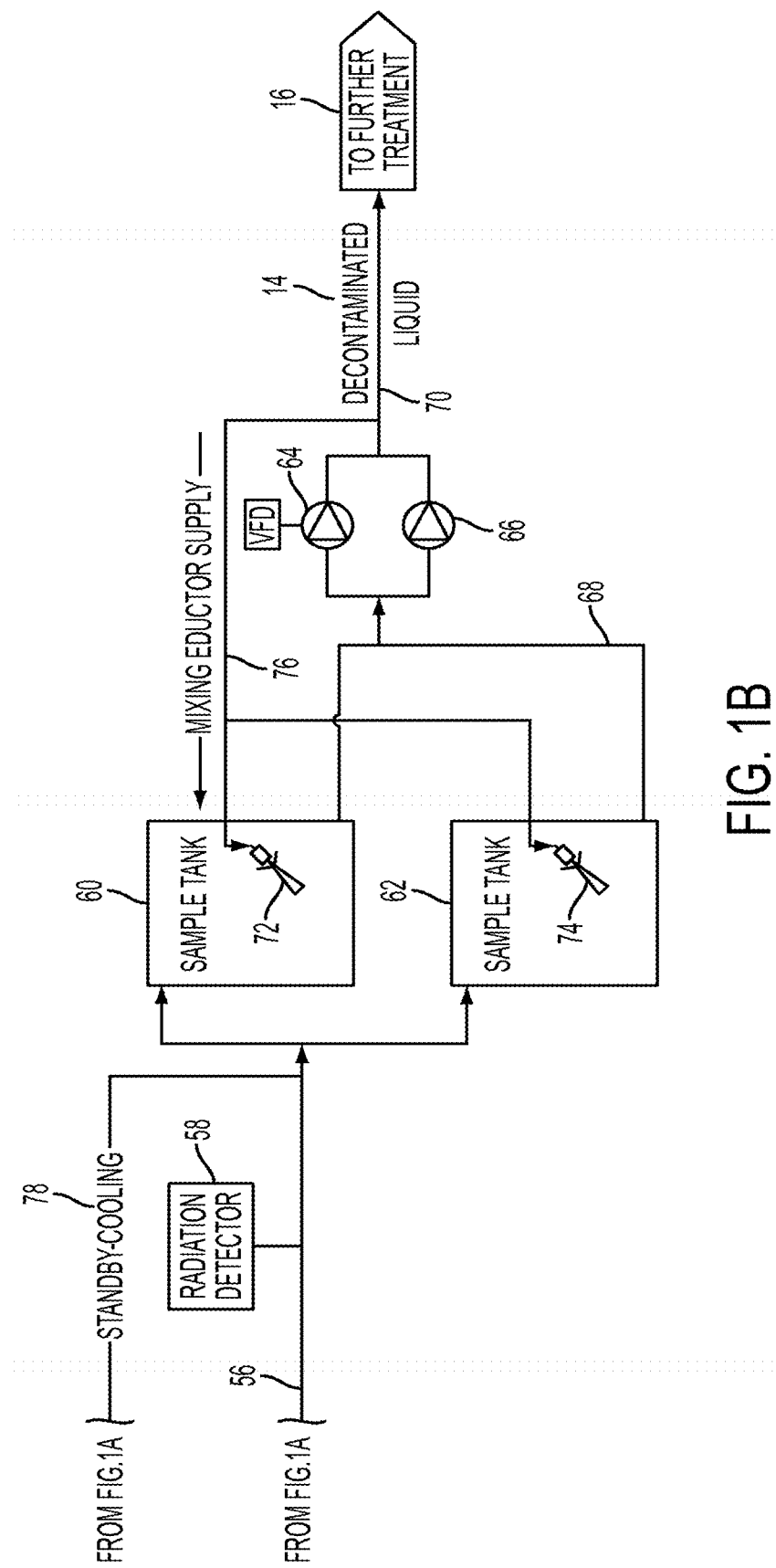
Figure 2:
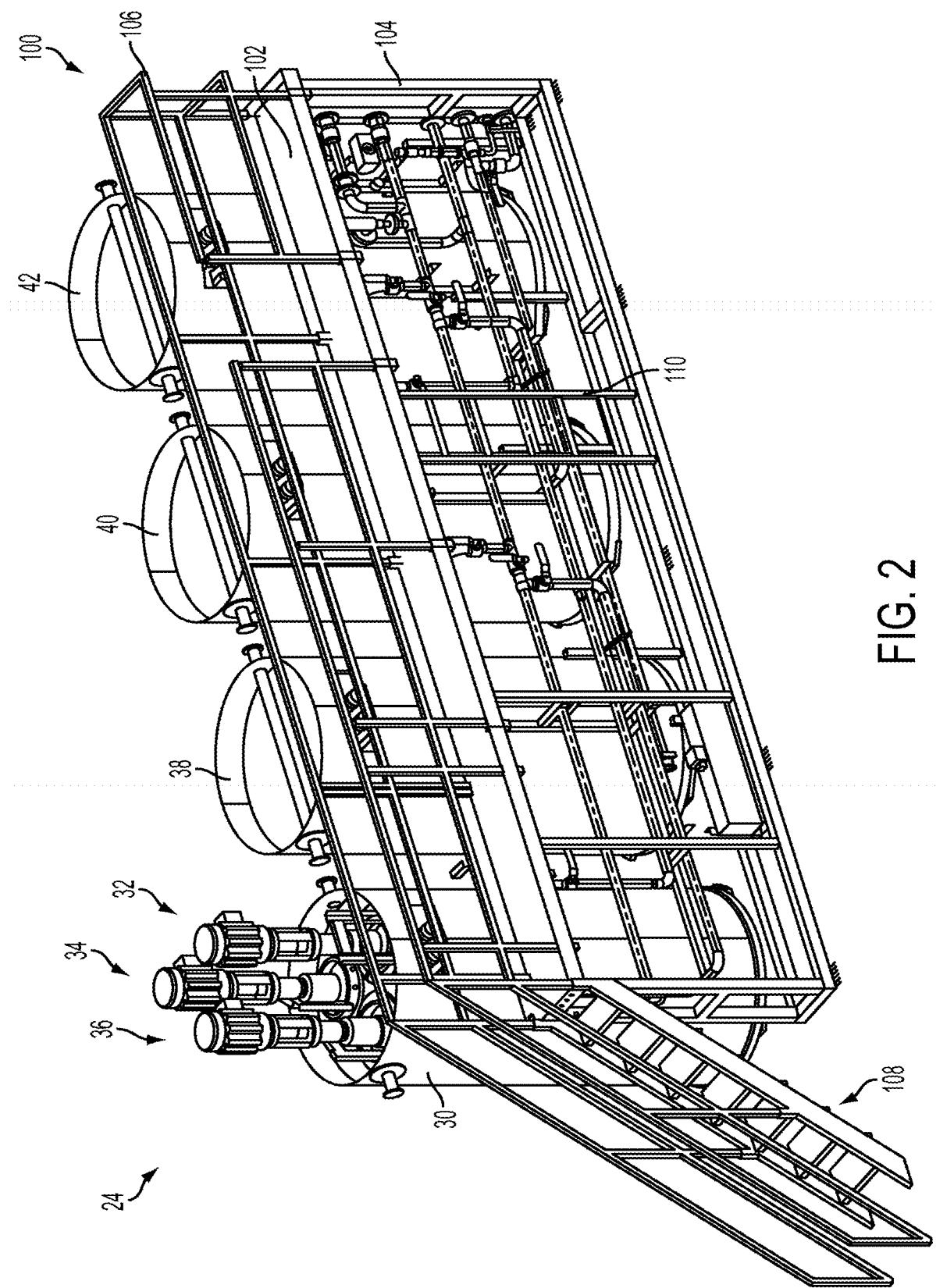
FIG. 2 is an isometric view of a near-tank filtration and ion exchange assembly in accordance with an embodiment of the present invention which may be used with the system of FIGS. 1A-1B.
Figure 3:
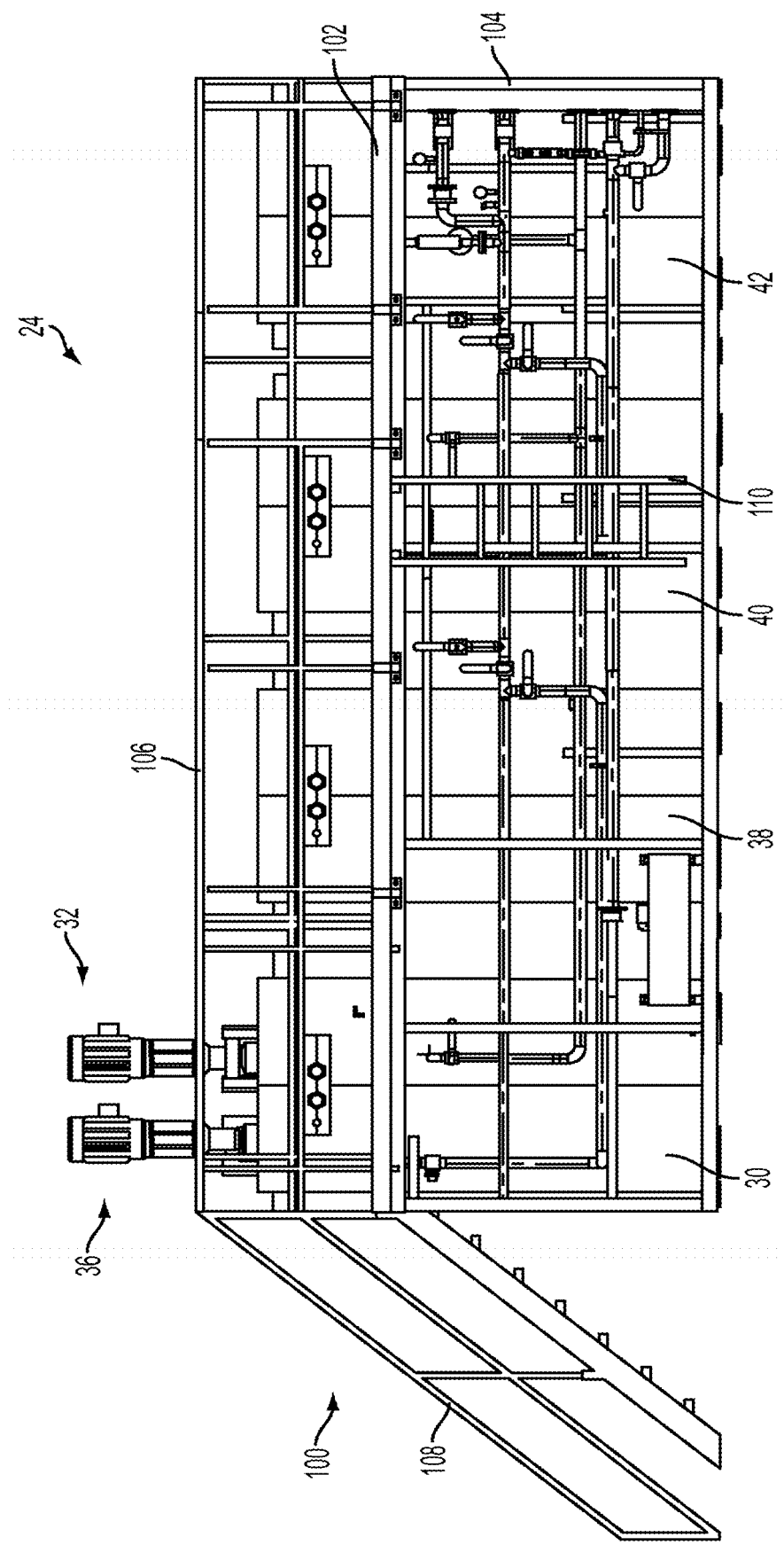
FIG. 3 is a side elevation view of the near-tank filtration and ion exchange assembly of FIG. 2.
Figure 4:
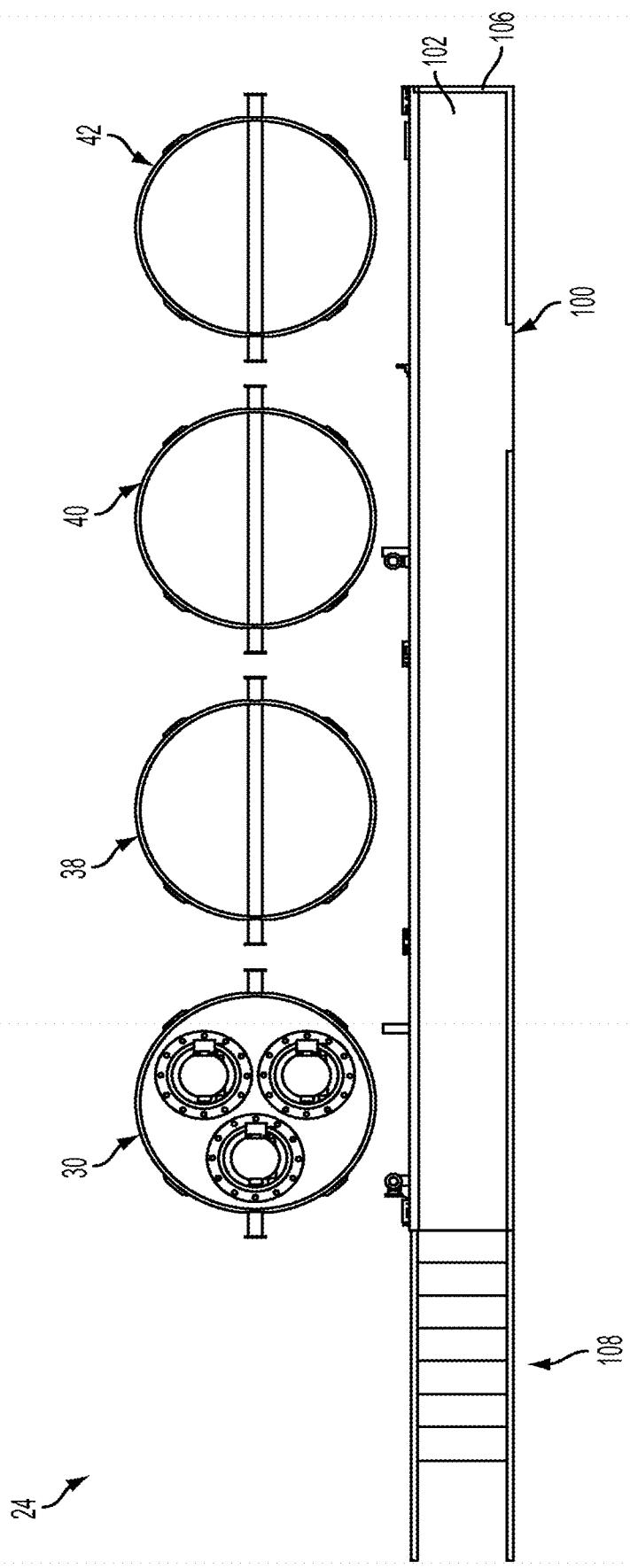
FIG. 4 is a top plan view of the near-tank filtration and ion exchange assembly of FIG. 2.
Figure 5:
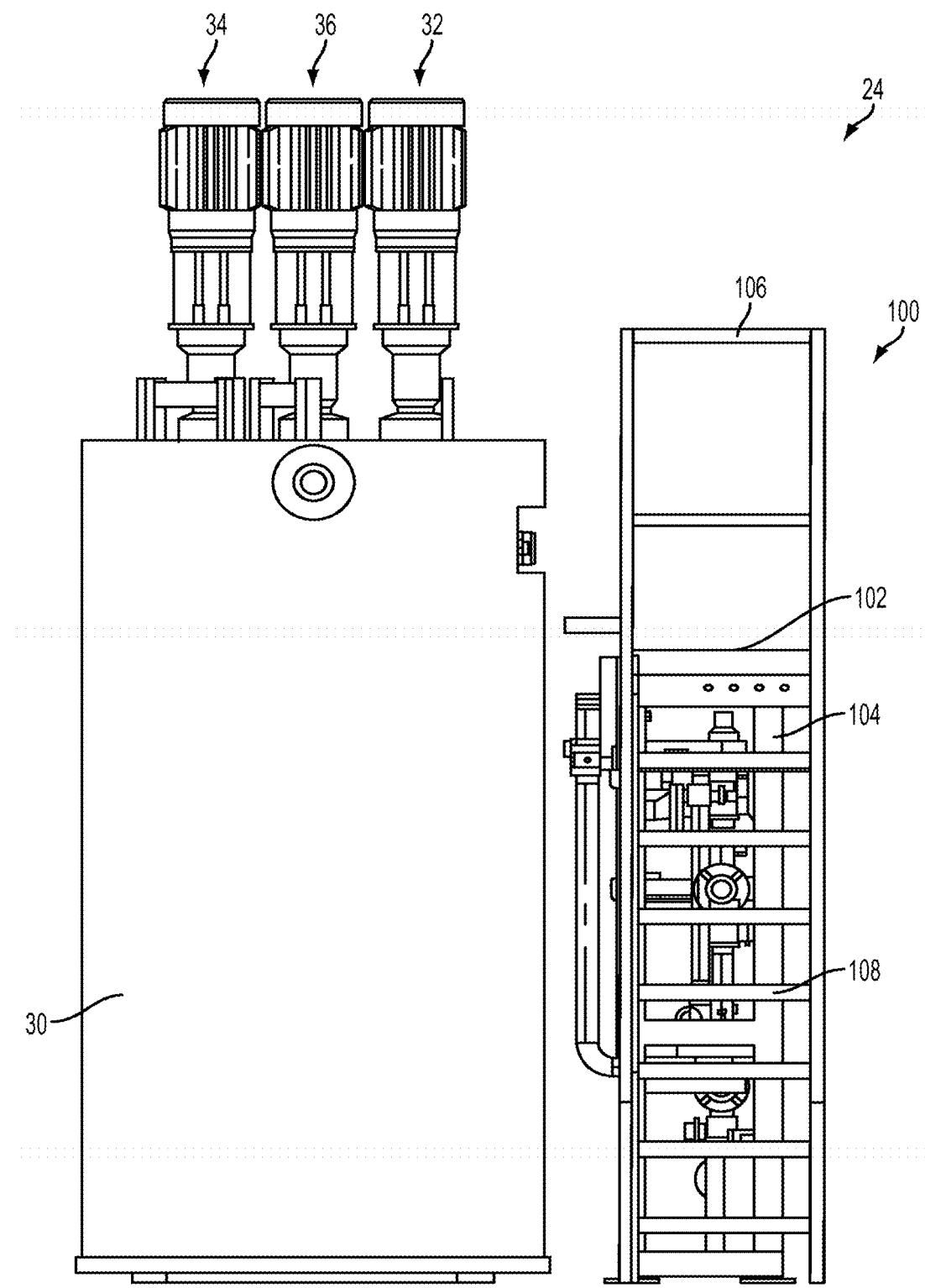
FIG. 5 is an end elevation view of the near-tank filtration and ion exchange assembly of FIG. 2.
Figure 6:
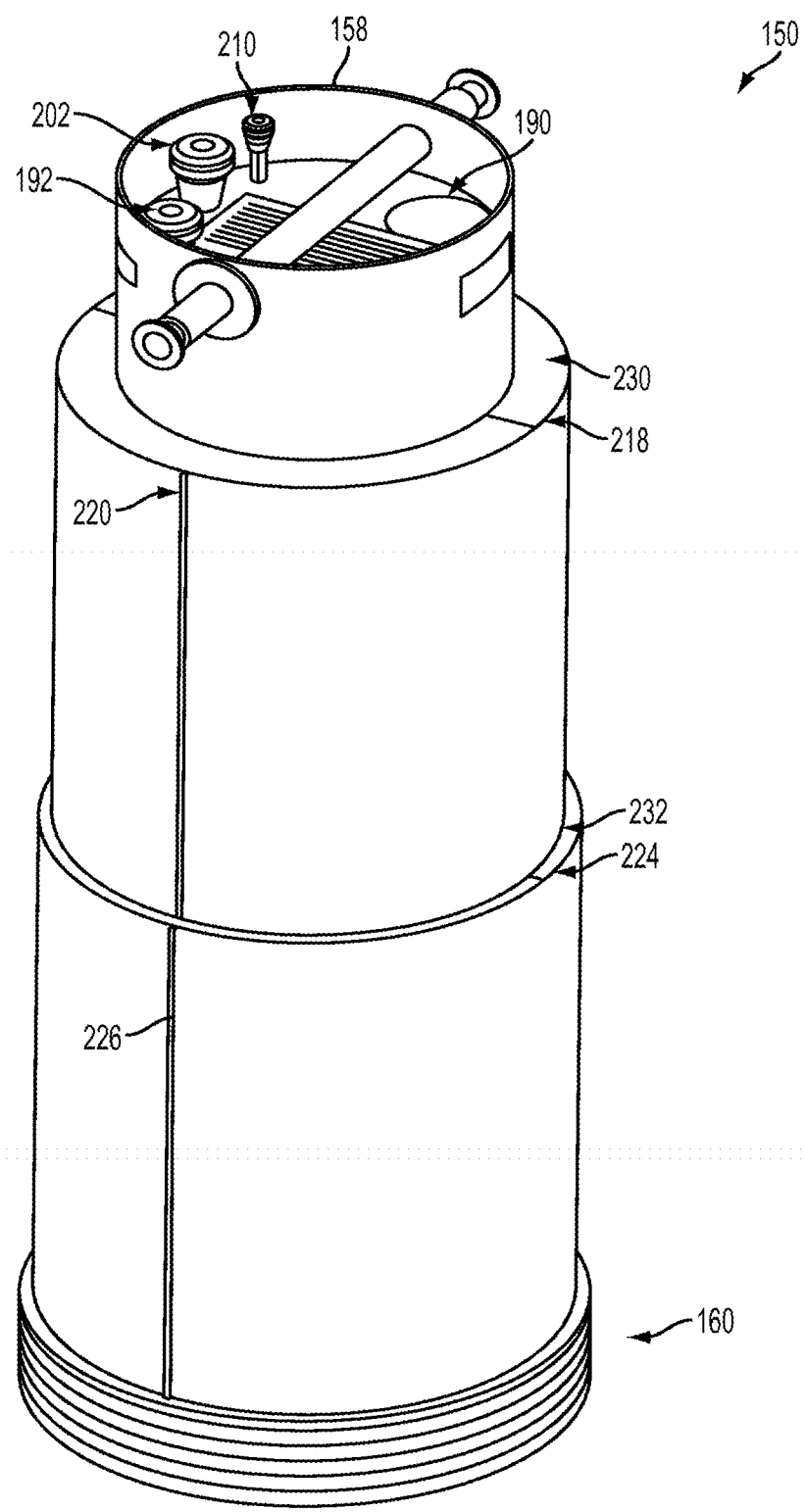
FIG. 6 is an isometric view of an exemplary ion exchange vessel that may be used with the system of FIGS. 1A-1B, for example as part of the filtration and ion exchange assembly of FIG. 2.
Figure 7:
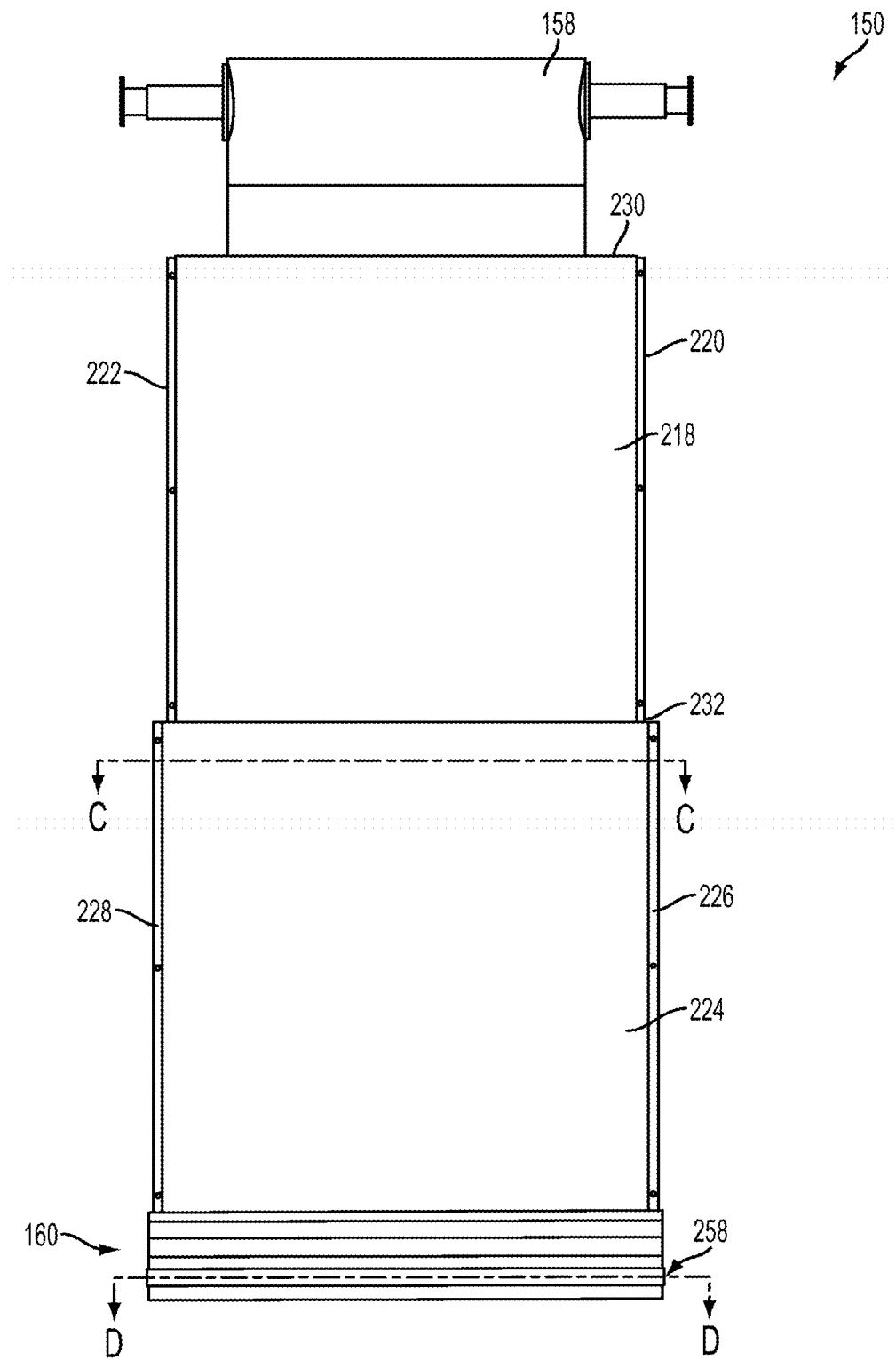
FIG. 7 is a side elevation view of the ion exchange vessel of FIG. 6.
Figure 8:
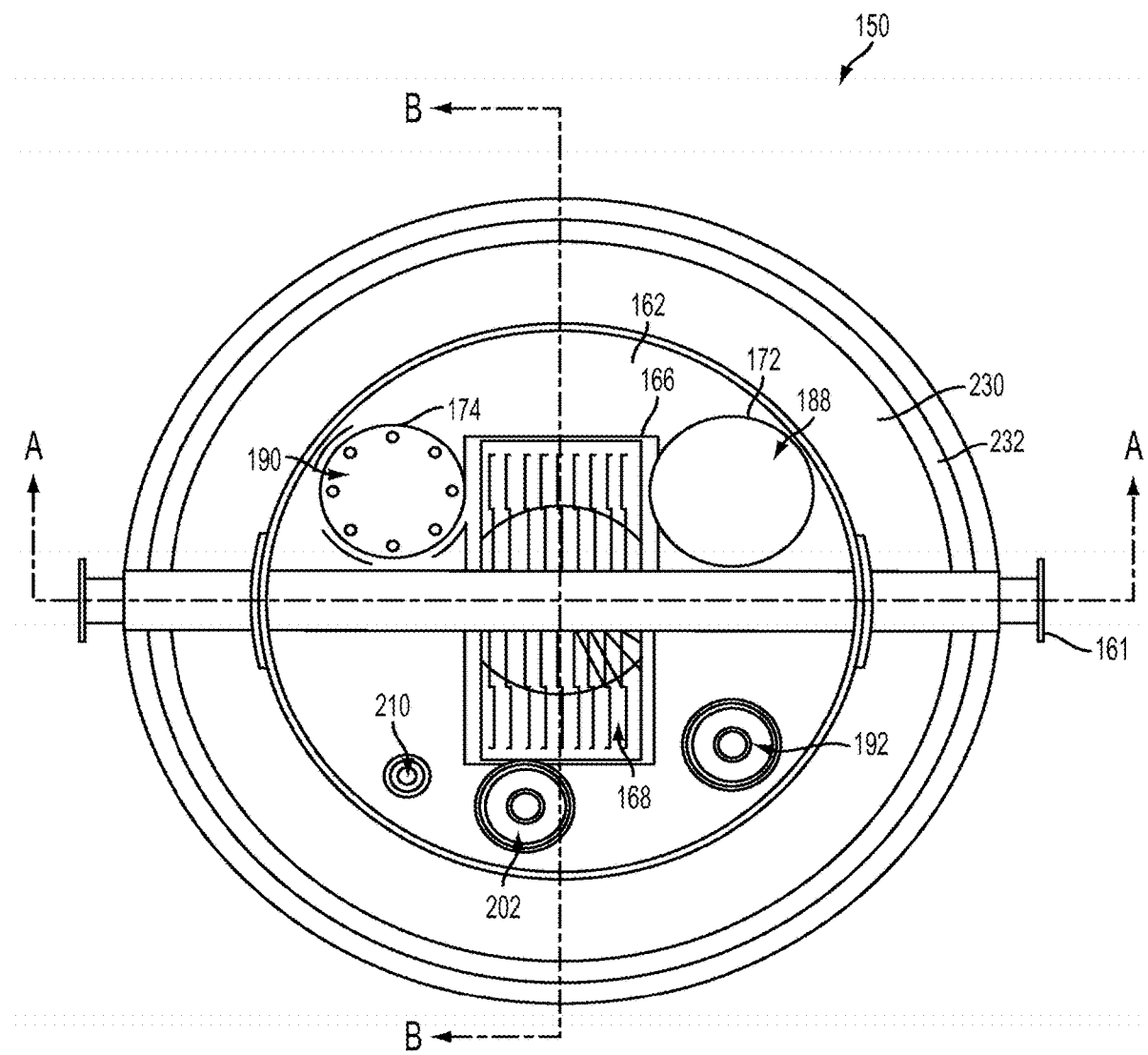
FIG. 8 is a top plan view of the ion exchange vessel of FIG. 6.
Figure 9:
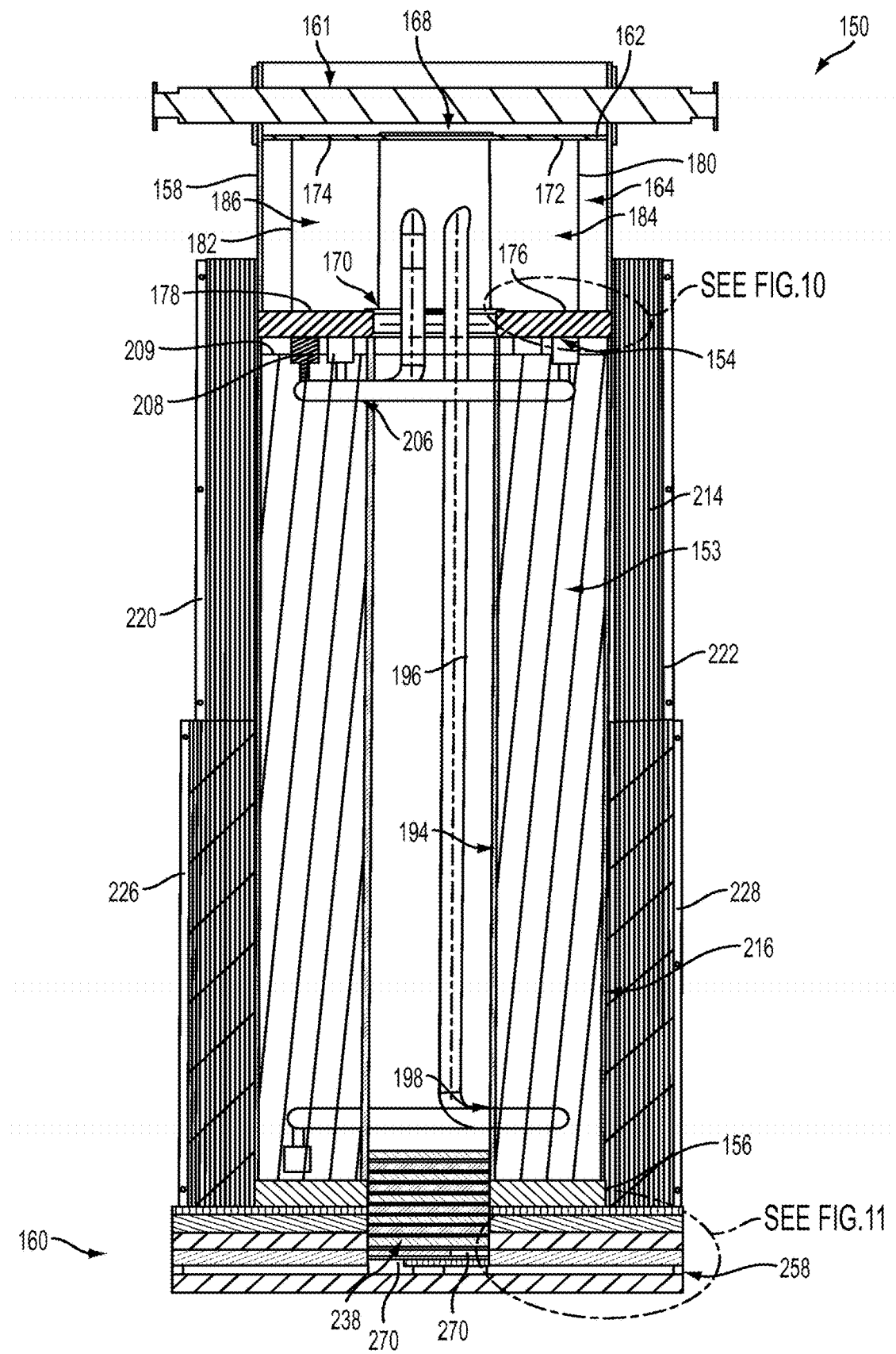
FIG. 9 is a cross-sectional view of the ion exchange vessel of FIG. 6 taken along line A-A of FIG. 8.
Figure 10:
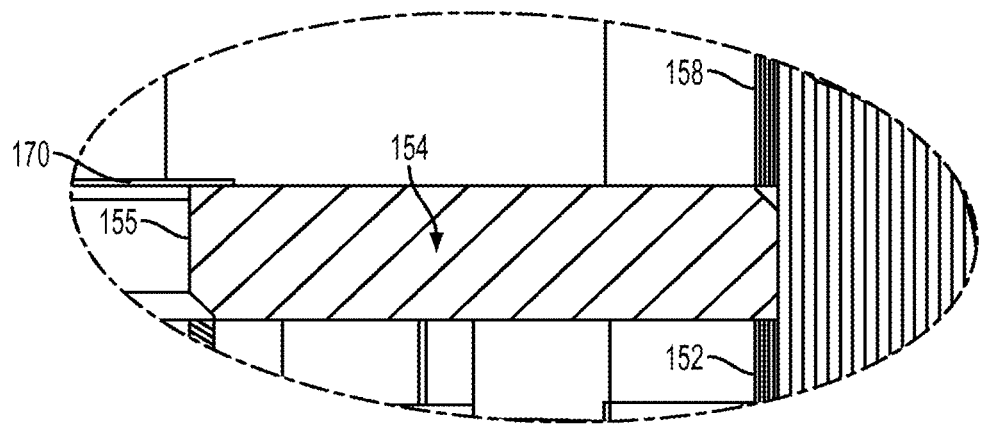
FIG. 10 is a cross-sectional detail view of the interface between the riser, upper plate, and ion exchange chamber of the ion exchange vessel of FIG. 6.

FIGS. 1A-1B are a schematic representation of a wastewater treatment system 10 at a nuclear facility in accordance with an embodiment of the present invention. A volume of high-level nuclear waste, for example containing one or more of radioactive strontium (Sr), actinides, and cesium (Cs), may be stored in a large storage tank 12. A given nuclear facility may comprise many storage tanks 12, though only one such tank is shown. In one example, storage tank 12 may have a volume of over 1 million gallons and store waste comprising supernate, salt cake, sludge, and solids. The supernate may comprise a liquid salt solution, which for example may have high concentrations of sodium nitrate and sodium nitrite salts. The sludge may contain precipitated solids and insoluble waste, and the solids may be in the form of crystallized salts ("saltcake").

Certain inventive aspects of system 10 are described in more detail below. In general, however, system 10 operates to remove one or more radionuclides (including but not limited to Sr, actinides, and Cs) from the supernate in storage tank 12, yielding a decontaminated salt solution (DSS) 14. DSS 14 may then be sent to another facility (e.g., via tanker trucks or pipeline) for further treatment 16 for final disposition. For example, DSS 14 may be immobilized in a grout, or cement, mixture and disposed in vaults. Those of skill in the art are familiar with other further treatments for DSS 14, such as transfer to a low level vitrifier. Finally, the sludge and solids in storage tank 12 may be transferred to a separate storage tank for eventual high level vitrification. The flow rate of liquid through system 10 may depend on the salt concentration in the supernate in storage tank 12. For example, at a facility where the salt concentration is low, the flow rate may be approximately 80-100 gallons/minute. Conversely, at a facility where the salt concentration is higher, the flow rate may be approximately 20 gallons/minute.

More particularly, in one embodiment, system 10 may first treat the waste in storage tank 12 using a Monosodium Titanate (MST) strike. Although this treatment is not required in all embodiments, it may be used to adsorb Sr and actinides in the supernate in storage tank 12, as will be appreciated by those of skill in the art. In this regard, a transfer pump 18 may pump MST from an MST storage tank 20 into storage tank 12. At least one submersible mixing pump 22 may be coupled with storage tank 12 to ensure that the MST may sufficiently adsorb Sr and actinides in the supernate. In an alternative embodiment, a strike may be performed external to tank 12 in a component or tank situated either upstream of the filtration vessel 30, in between the filtration vessel 30 and the ion exchange vessels 38, 40, 42, or downstream of the ion exchange vessels 38, 40, 42.

Next, to process the supernate in storage tank 12, system 10 preferably comprises a filtration and ion exchange assembly 24 in fluid communication with storage tank 12. As shown, for example, system 10 may comprise a transfer pump 26 coupled with storage tank 12 that is operable to pump the supernate from storage tank 12 to filtration and ion exchange assembly 24 via suitable piping 28, which may be secondarily-contained and shielded. To avoid passing particulates or other solids into the ion exchange vessel(s), which may foul the ion exchange media, the liquid waste is preferably filtered upstream thereof. Moreover, where an MST strike is used prior to filtration, filtration may further ensure that actinides are not present in the waste stream that is fed into the ion exchange vessel(s).

Thus, filtration and ion exchange assembly 24 may preferably comprise a plurality of filters upstream of a plurality of ion exchange vessels. In the illustrated embodiment, filtration and ion exchange assembly 24 comprises a filtration vessel 30 which includes three filters 32, 34, 36. Further, filtration and ion exchange assembly 24 comprises three ion exchange vessels 38, 40, 42 in this embodiment. Ion exchange vessels 38, 40, 42 may be in a lead-middle-lag configuration downstream of filtration vessel 30. Ion exchange vessels 38, 40, 42 are in fluid communication with filtration vessel 30 via piping 44, which may also be secondarily contained and shielded. Although three filters 32, 34, 36 are shown in this embodiment, those of skill in the art will appreciate that other embodiments may have fewer or more than three filters. Likewise, other embodiments may comprise two ion exchange vessels, for example in a lead-lag configuration, one ion exchange vessel, or more than three ion exchange vessels, depending on the requirements of a particular liquid treatment system.

In a preferred embodiment, filters 32, 34, 36 may be rotary microfilters (RMFs) operating in parallel or in series. Those of skill in the art are familiar with RMFs suitable for this purpose, but in a preferred embodiment, the RMFs may be analogous to the RMFs described in U.S. Pat. No. 7,926,666, the disclosure of which is incorporated by reference herein in its entirety for all purposes. Commercially available RMFs are offered by Spintek Filtration of Los Alamitos, Calif. Additionally, aspects of RMFs are described in Christophe A. Serra & Mark R. Wiesner, A Comparison of Rotating and Stationary Membrane Disk Filters Using Computational Fluid Dynamics, Journal of Membrane Science 165 (2000) 19-29, incorporated herein by reference in its entirety for all purposes. Other embodiments may of course use other suitable filters known to those of skill in the art.

Preferably, the RMF units and their associated piping are mounted in filtration vessel 30, which is preferably suitably shielded. The RMF units may be mounted into the top of the filtration vessel 30 with a rotating mechanical seal or similar sealing device that allows pressurized operation of the RMF. This configuration allows both the filtration vessel 30 and the ion exchange vessels 38, 40, 42 to be handled and moved with the exact same hoist and mechanical rigging. In one embodiment, each RMF unit may contain 25 flat, round 0.5 micron filter element disks set on a hollow rotating shaft inside a stationary cylindrical housing. Supernate from storage tank 12 enters filtration vessel 30, where it is then fed into each RMF unit. The supernate is distributed across each RMF element surface and is forced through each filter element. The permeate (aka filtrate) which results from the microfiltration is a filtered salt solution (FSS). The FSS may be collected in the hollow shaft of each RMF and discharged to piping 44, where it is transferred to ion exchange vessel 38.

The retentate stream (sometimes known as a concentrate or reject stream) output from the RMF(s) may be continuously returned to storage tank 12. In particular, in each RMF, stationary disks oppose the rotating element disks and thus act to prohibit fluid rotation. Rather than depositing on the filter elements, solids may be carried into a return piping 46 via centrifugal force. Return piping 46, like piping 28 and 44 above, may preferably be secondarily contained and shielded. It will thus be appreciated that a back pulse system is not required, though it may be provided in some embodiments. (Further, some embodiments of filters 32, 34, 36 may comprise a connection by which acid or other chemicals may be added for cleaning and dissolving debris from the filter element.) Piping 46 then carries the retentate stream back to storage tank 12.

Although FIGS. 1A-1B illustrate filters 32, 34, 36 operating in parallel, it will be appreciated that filters 32, 34, 36 may also be operated in series, as noted above. In fact, in some installations a series operation may provide better performance than parallel operation due to high cross-flow "flushing" velocities. The feed flow to filter 32 may have somewhat similar characteristics to the rententate stream output from filter 32 because only a small portion of the process stream may be removed as filtrate, and thus configuring the retentate stream output from filter 32 to flow into a second or third filter (such as filters 34 or 36) is not a problem.

FSS leaving filtration vessel 30 may then pass through a turbidity analyzer 48. Turbidity analyzer 48 may analyze the turbidity of the FSS to ensure that filters 32, 34, 36 are operating properly. Should the turbidity measurement fail to be acceptable, then the treatment system 10 may be shutdown prior to fouling of the ion exchange media.

Assuming the turbidity measurement is acceptable, the FSS passes via piping 44 to ion exchange vessels 38, 40, and 42, in sequence, for removal of radionuclides. In one embodiment, ion exchange vessels 38, 40, 42 may be used to remove Cs from the FSS, though they may remove other radionuclides in addition or in alternative to Cs in other embodiments. In the illustrated embodiment, ion exchange vessels 38, 40, and 42 may each preferably be loaded with suitable ion exchange media for removing Cs. In preferred embodiments, the ion exchange media may be Crystalline Silicotitanate (CST) media. Examples of commercially available CST media are IONSIV® IE-911, offered by UOP LLC of Des Plaines, Ill., and HS-726, offered by Hitachi GE Nuclear Energy, Ltd. of Hitachi City, Japan. As those of skill in the art will appreciate, CST media has a high affinity for Cs (and may also be used to remove Sr), but it is a non-regenerable sorbent that can only be loaded once. Thus, once the CST media in a given ion exchange vessel is spent (which may for example be after approximately weeks or months of use, depending on the physical, chemical, and radiological characteristics of the FSS), the ion exchange vessel may preferably be removed from service and placed in storage pending further processing. During storage, the loaded CST media generates heat, and thus the stored ion exchange vessels may need to be cooled. One example of a technique for passively cooling the stored ion exchange vessels is provided in the above-referenced '644 publication. In other embodiments, loaded ion exchange media may be sluiced from the appropriate ion exchange vessel to a separate storage tank for further processing and/or storage.

Importantly, and as discussed in more detail below, ion exchange vessels 38, 40, and 42 are preferably operated in up-flow, rather than in down-flow, which is used in the prior art. Thus, FSS may first flow from piping 44 into lead ion exchange vessel 38, where it flows upward through the ion exchange media. The FSS stream may then exit ion exchange vessel 38 via piping 52 and enter middle ion exchange vessel 40. After flowing upward through the ion exchange media therein, the FSS stream may exit ion exchange vessel 40 via piping 54 and enter lag ion exchange vessel 42. Finally, the FSS stream may exit ion exchange vessel 42 via piping 56. Piping 52, 54, 56 may preferably be secondarily contained and shielded.

As noted above, the output from ion exchange vessel 42 is DSS 14. DSS 14 may pass along piping 56 and encounter a radiation detector 58. Radiation detector 58, which in one embodiment may be a scintillation detector using sodium iodide activated with thallium (or another suitable scintillation detector), may analyze DSS 14 for the presence of ionizing radiation. Thus, radiation detector 58 may serve as a gross indicator of whether the ion exchange process is suitably removing the targeted radionuclide from the FSS stream. Radiation detector 58 may thus also provide information regarding whether the ion exchange media is spent, thus alerting the operator to shut-down the treatment system 10 for ion exchange vessel 38, 40, 42 replacement or a similar remedial action.

Assuming the targeted radionuclide (e.g., Cs and/or Sr) has been suitably removed, DSS 14 then passes into two sample tanks 60, 62. DSS 14 is circulated (mixed) and stored in sample tanks 60, 62 so that personnel may sample DSS 14 and ensure that it meets applicable waste acceptance criteria for any further treatment 16. System 10 may further comprise two pumps 64, 66 in a parallel configuration. When it is determined that the waste acceptance criteria have been satisfied, pumps 64, 66 are operable to pump DSS 14 to the appropriate further treatment 16 such as via suitable secondarily-contained, shielded piping 68. Although only one pump 64 or 66 may be required, two pumps 64 and 66 provides redundancy. In use, only one of pumps 64 and 66 may operate until worn-out, in which case the other could be readily implemented. Pumps 64, 66 are preferably in fluid communication with tanks 60, 62 via piping 70, which may also be secondarily-contained and shielded.

Typically, only one of sample tanks 60 or 62 may receive DSS 14 from filtration and ion exchange assembly 24 at a time, which allows the other of tanks 60 or 62 to be sampled. Notably, system 10 preferably comprises a bypass loop to facilitate mixing of the DSS 14 in the tank 60 or 62 that is being sampled. In particular, sample tanks 60, 62 preferably comprise mixing eductors 72, 74 disposed therein to mix the DSS 14 and ensure a homogenous sample. Via piping 76, mixing eductors 72, 74 are preferably in fluid communication with piping 70 downstream of pumps 64, 66. Thus, for example, when tank 60 is being sampled, tank 62 may be receiving DSS 14 from filtration and ion exchange assembly 24. System 10 may cause the pump 64 or 66 that is in operation to pump DSS 14 out of tank 60. System 10 may then cause the DSS 14 leaving the pump to bypass further treatment 16 and instead pass from piping 70 into piping 76, ultimately returning to mixing eductor 72, which mixes DSS 14 in tank 60. Assuming the sample meets the applicable waste acceptance criteria, system 10 may then cause the pump to pump DSS 14 from tank 60 to further treatment 16. DSS 14 stored in tank 62 may then be mixed and sampled in a similar fashion, and tank 60 may then receive DSS 14 from filtration and ion exchange assembly 24.

Those of skill in the art will appreciate that large amounts of heat may be generated during operation of system 10. When system 10 is operating, the liquid stream flowing through system 10 cools the various components. However, when system 10 is shutdown for any reason, the liquid stream may not be flowing. Thus, system 10 may comprise a standby cooling loop 78 which may extend at least between piping 56 (downstream of ion exchange vessels 38, 40, and 42) and piping 44 (upstream of ion exchange vessels 38, 40, and 42). As shown, cooling loop 78 may comprise a heat exchanger 80 which may facilitate heat transfer from the heated liquid waste stream. A pump 81 may be provided along cooling loop 78 upstream of heat exchanger 80 to pump the liquid stream therealong. Additionally, as indicated by broken line 82, in other embodiments cooling loop 78 may extend to piping 28 upstream of filtration vessel 30.

Further, those of skill in the art are familiar with suitable maintenance systems for system 10. In one nonlimiting example, inhibited water, such as water mixed with sodium hydroxide, may be pumped from a tank 84 and used to clean system 10 components. Inhibited water is used to maintain needed or desired pH levels in certain system components, as those of skill in the art will appreciate. Tank 84 may be in fluid communication with piping 28 via piping 86. A pump 88 disposed along piping 86 may be used to pump the inhibited water from tank 84 into piping 28 and the other components in system 10. Thus, when system 10 is not in use, the inhibited water may be used to flush filtration and ion exchange assembly 24 for maintenance or to prevent corrosion.

In addition, system 10 may be configured to receive compressed air from a compressed air source 90. In particular, via piping 92, compressed air source 90 may be in fluid communication with piping 10 (and thus, the other system components). Accordingly, compressed air source 90 may force air throughout system 10 to remove water from components of system 10, for example prior to disconnecting a component for repair or service.

FIGS. 2-5 illustrate additional details regarding embodiments of filtration and ion exchange assembly 24. By way of background, wastewater treatment systems at nuclear facilities are often somewhat decentralized. For example, the storage tank containing wastewater to be processed may be separated from other system components, such as filters, ion exchange components, or other storage tanks, by miles of piping. As will be appreciated, this is both expensive and inefficient. Further, as described above, although CST media is a particularly effective media for removing Cs and/or Sr from liquid feed streams, significant amounts of decay heat can be generated from loaded (spent) media. Thus, although large ion exchange vessels using CST media have been proposed for treatment of salt wastes at nuclear facilities, they have not been adopted due to containment, heat dissipation, and shielding requirements.

More recently, however, in an effort to avoid these containment, heat dissipation, and shielding requirements, it has been proposed to install a smaller ion exchange vessel in an "in-tank" configuration. More particularly, in this configuration, system components, including pumps, filters, and ion exchange columns, are installed inside a riser disposed on top of the storage tank. Because the tank also includes secondary containment and shielding, it is not necessary to build additional shielded facilities. The system components extend into the storage tank to process the liquid waste located therein.

However, there are a number of drawbacks to such an in-tank configuration. First, installing a column into the tank is challenging due to the close tolerances and hazardous environment. In particular, the treatment column must fit precisely within a riser located on a tank that may have been constructed several decades prior. Even though drawings may exist, achieving a perfect fit-up between the "in-tank" ion exchange column and the riser will be challenging. This may be especially true because the riser is in a hazardous environment where work activities are complicated due to personal protective equipment requirements. Second, due to the weight and dimensional limitations, it is not practical to add shielding to an in-tank type column. Therefore, the in-tank column cannot be simply removed from service and placed into storage (like embodiments of the present invention). This further complicates operations because the loaded media must be transferred from the column through interconnecting piping to a grinding component that reduces the ion exchange media size to approximately 30-micrometers or less. This may allow the ground CST to mix with ambient tank sludge without separating. Third, there is minimal air flow inside the high level waste tanks. Therefore, the in-tank column must be actively cooled at all times. Fourth, the waste tank must have substantial structural strength and integrity to hold the weight of the in-tank column and its ancillary components, such as an RMF prefilter and media grinder. Accordingly, only the Type III tanks at SRS have been qualified to support the in-tank components. It is expected that most older facilities will not want to add this amount of weight and increased stresses on tanks that may already be leaking.

In contrast, and as described in more detail below, the configuration of the components of filtration and ion exchange assembly 24 preferably allow the assembly to be positioned in a simple "near-tank" facility. In other words, components of filtration and ion exchange assembly 24 need not be and are not installed "in-tank" or in one or more separate shielded structures or facilities remote from the storage tank. Thus, extensive piping between a storage tank and other components is no longer required. Of course, the proximity of embodiments of filtration and ion exchange assembly 24 to a given waste tank may be dictated by the requirements at a given facility. To take two nonlimiting examples, embodiments of filtration and ion exchange assembly 24 may be located within 500 feet of waste tanks at the Hanford facility, and embodiments of filtration and ion exchange assembly 24 may be located up to 5000 feet from the waste tanks at the Fukushima facility in Japan. In any event, because they are configured to be positioned adjacent to or in close proximity to a liquid storage tank, embodiments of the filtration and ion exchange assembly 24 may be portable, in that they may be disassembled and moved from one tank to the next as a particular job is completed.

As shown in FIGS. 2-5, in one embodiment, filtration and ion exchange assembly 24 may comprise a gangway 100. Gangway 100 may provide a technician or other personnel access to filtration vessel 30 and ion exchange vessels 38, 40, 42. In this regard, gangway 100 preferably comprises an elevated platform 102 and a support structure, or underbody, 104 which supports platform 102. Gangway 100 may preferably be of a lightweight metal construction, for example welded steel or aluminum. Notably, piping (e.g., piping 28, 44, 52, 54, 58) and other components associated with filtration vessel 30 and ion exchange vessels 38, 40, 42 may be disposed beneath platform 102 in underbody 100. Thus, underbody 100 may provide an area where traditionally more spread out components may be located in a compact footprint that is also readily accessible, which facilitates near-tank placement.

Preferably, filtration vessel 30 and ion exchange vessels 38, 40, 42 may be equally spaced alongside of and parallel with platform 102. Further, the vessels are preferably spaced close enough to gangway 100 to provide ready access thereto by an operator standing on platform 102. In this regard, gangway 100 may also comprise guardrails 106 surrounding platform 102, which may be accessible by stairs 108 and/or a ladder 110. As shown, in one embodiment, the construction of filtration vessel 30 is preferably in several respects analogous to that of ion exchange vessels 38, 40, 42, aspects of which are described in greater detail below, though this is not required.

FIGS. 6-15 illustrate an ion exchange vessel 150 constructed in accordance with an embodiment of the present invention. Ion exchange vessel 150 may be used with system 10 as a component of filtration and ion exchange assembly 24. Thus, ion exchange vessels 38, 40, and 42 may preferably be analogous to ion exchange vessel 150 in some embodiments. In other embodiments, however, ion exchange vessel 150 may be used as a standalone unit or as part of another liquid treatment system. In a preferred embodiment, ion exchange vessel 150 may be constructed to meet applicable requirements regarding the construction of pressure vessels, such as the requirements defined in the American Society of Mechanical Engineers Boiler and Pressure Vessel Code, Section VIII (incorporated by reference herein in its entirety for all purposes).

Ion exchange vessel 150 may preferably also serve as a storage module for spent ion exchange media. For example, vessel 150 may be brought into a nuclear facility and connected to plant equipment, where water may flow through the vessel until the media reaches its maximum radiological capacity (e.g., maximum Cs & Sr loading) or is exhausted (DF≈1). At this point, water may be blown from the vessel, connections may be secured, and the vessel may be transported to an interim spent storage facility. There, the vessel may be stored for a long period of time (for example many years or up to hundreds of years) to allow radiolytic decay of the radionuclides, after which time the spent media may be removed and disposed of as low-level radioactive waste.

Referring now to the figures, ion exchange vessel 150 may comprise an outer shell 152 extending between middle and lower plates 154, 156, respectively. Outer shell 152 and plates 154, 156 may thereby define an ion exchange chamber 153. In operation of ion exchange vessel 150, ion exchange chamber 153 may be filled with any ion exchange media that is needed or desired for a particular liquid treatment process. In the example of system 10 discussed above, ion exchange chamber 153 may be filled with CST type media. In this regard, FIGS. 9 and 12-14 illustrate ion exchange vessel filled with ion exchange media to a height 209. In any event, in a preferred embodiment, outer shell 152 may be cylindrical in shape and formed of an austenitic or duplex stainless steel (or a similar corrosion-resistant alloy, such as Alloy 20, Hastelloy, etc.), though this is not required. Plates 154, 156 may likewise be formed of stainless steel and be annular in shape, having centrally disposed apertures 155, 157 respectively defined therein. In one example, plates 154, 156 may be approximately 3 in. thick and outer shell 152 may be approximately 0.5 in. thick. The outer diameter of middle and lower plates 154, 156 may preferably be substantially equal to the outer diameter of outer shell 152.

Next, ion exchange vessel 150 may comprise a riser 158 which rests on middle plate 154 and a base 160 on which lower plate 156 rests. Riser 158, which may preferably be formed of stainless steel, may also have an outer diameter that is substantially equal to the outer diameter of outer shell 152 and plates 154, 156. As described in more detail below, base 160, which in one embodiment may comprise a plurality of stacked plates, may preferably have a somewhat larger outer diameter than that of outer shell 152 and plates 154, 156. Ion exchange vessel 150 may further be provided with a lifting trunnion 161 which, in the illustrated embodiment, may be integrally coupled with riser 158. It will be appreciated that lifting trunnion 161 may facilitate handling and transport of ion exchange vessel 150.

Within riser 158 may be an upper plate 162 which is fixed above middle plate 154 such that riser 158, upper plate 162, and middle plate 154 define an upper chamber 164. Upper plate 162 may preferably define an aperture 166 therein. Aperture 166, which in one embodiment may be rectangular in shape, preferably has a centerline that is collinear with a diameter of upper plate 162 and is disposed over aperture 155 in middle plate 154. Accordingly, as discussed in more detail below, upper chamber 164 is not fully enclosed, but allows air to flow between aperture 155 and aperture 166. In this regard, a plate cover 168 may be secured over aperture 166 and a plate cover 170 may be secured over aperture 155. Upper plate 162 may also be formed of stainless steel and, in one embodiment, may be approximately 0.5 in. thick. Additionally, in one embodiment, plate covers 168 and 170 may be formed of 18 mesh stainless steel.

Upper plate 162 may further define a pair of laterally-opposed apertures 172, 174 spaced on either side of aperture 166, and middle plate 154 may further define a pair of laterally-opposed apertures 176, 178 which are aligned with apertures 172, 174. Extending between aperture 172 and aperture 176 and between aperture 174 and aperture 178 may be tubing 180, 182, respectively. Thereby, tubing 180 and tubing 182 may each define a port 184, 186 through which a technician or other personnel may inspect ion exchange chamber 153. Further, ports 184, 186 provide a means for removing spent ion exchange media, for example for further processing (e.g., vitrification), storage, or disposal. Ports 184, 186 may be closed by removable plugs or covers 188, 190. Plugs 188, 190, which may preferably be formed of stainless steel, may be secured over apertures 172, 174 in upper plate 162 with bolts or other suitable fasteners.

As noted above, ion exchange vessel 150 may preferably be configured to operate in up-flow, rather than in down-flow as in the prior art. In this regard, ion exchange vessel 150 may comprise a process inlet 192 disposed in riser 158 above upper plate 162. In one embodiment, process inlet 192 may comprise a 3 in. Drylok quick disconnect valve, flange, or similar connection point. Ion exchange vessel 150 may further comprise an inner shell 194 which preferably extends between lower plate 156 and middle plate 154 and may preferably have an inner diameter that is substantially equal to that of apertures 155, 157. Preferably, inner shell 194 may be formed of stainless steel (or another suitable corrosion-resistant material as described above), and in one example it may be approximately 0.5 in. thick. An inlet spool 196 may extend from process inlet 192 through upper chamber 164 and down through inner shell 194, where it may exit inner shell 194 into chamber 153 and terminate in an inlet diffuser 198. Thus, inner shell 194 may separate a portion of inlet spool 196 from ion exchange chamber 153. Inlet diffuser 198, which as shown may be annular in shape and concentric with inner shell 194, preferably comprises a plurality of downward-facing inlet screens 200. As will be appreciated by those of skill in the art, inlet screens 200 may be cylindrical in shape and define a plurality of holes through which liquid may enter ion exchange vessel 150. Inlet screens 200 are preferably equally spaced about diffuser 198 to facilitate an even distribution of liquid entering ion exchange vessel 150 in ion exchange chamber 153.

Ion exchange vessel 150 may further comprise a process outlet 202 disposed in riser 158 above upper plate 162. In one embodiment, process outlet 202 may comprise a 3 in. Drylok quick disconnect valve, flange, or similar connection point. An outlet spool 204 may extend from process outlet 202 through upper chamber 164 and down through inner shell 194, where it may exit inner shell 194 into chamber 153 and terminate in an outlet collection header 206. Thus, inner shell 194 may also separate a portion of outlet spool 204 from ion exchange chamber 153. Outlet collection header 206, which as shown may be annular in shape and concentric with inner shell 194, may preferably be located proximate middle plate 154. Outlet collection header 206 preferably comprises a plurality of upward-facing outlet screens 208. Outlet screens 208 may preferably be analogous to inlet screens 200, described above. Thus, outlet screens 208 are preferably equally spaced about header 206 to facilitate collection of liquid exiting ion exchange chamber 153. In this regard, outlet screens 208 may preferably extend at least partially above the height 209 of the ion exchange media in ion exchange chamber 153.

In a preferred embodiment, process inlet and outlet 192, 202, inlet and outlet spools 196, 204, and inlet diffuser and outlet collection headers 198, 206 may all be formed of stainless steel. Moreover, in other embodiments, process inlet and outlet 192, 202 need not be disposed in riser 158. For example, process inlet 192 could be located on the exterior of ion exchange vessel 150, such as at base 160.

A vent 210 may also be disposed in riser 158 above upper plate 162. In one embodiment, vent 210 may comprise a 1 in. Drylok quick disconnect valve, flange, or similar connection point. A vent spool 212 may extend from vent 210 through upper chamber 164. Vent spool 212 may also pass through a corresponding aperture defined in upper plate 162 and terminate at ion exchange chamber 153. Preferably, vent spool 212 may be formed of stainless steel.

As shown, inlet diffuser 198 may preferably be located near the bottom of ion exchange chamber 153 such that inlet screens 200 are located proximate lower plate 156. Thus, liquid entering ion exchange vessel 150 will enter at the bottom of ion exchange chamber 153, rather than at the top as in the prior art, and flow upward through the ion exchange media located therein. After the liquid passes through the ion exchange media and reaches the top of ion exchange chamber 153, the liquid may be collected via outlet screens 208 associated with outlet collection header 206. The liquid may then flow upwards through outlet spool 204 and exit ion exchange vessel 150 via process outlet 202.

Configuring ion exchange vessel 150 for up-flow operation has several notable advantages. For example, during operation, emission of radiation may cause radiolytic decomposition of water and other hydrogen-containing compounds that produces hydrogen gases. In prior art ion exchange vessels operated in down-flow, at least some of these gases could be trapped in the ion exchange chamber, which could lead to an explosive environment within the ion exchange media or uneven flow distribution that could lead to inefficient use of the media. In embodiments of the ion exchange vessel of the present invention, however, up-flow operation passively purges these gases from the ion exchange chamber during regular operation. In particular, the gases are passed into the effluent through outlet screens 208 associated with outlet collection header 206. The gases then travel with the liquid, eventually ending at a storage tank (e.g., sample tanks 60, 62) that is appropriately vented through an engineered gas ventilation system. In one example, a volume of up to 10 liters of gas/hour may be purged from ion exchange vessel 150. In one embodiment, vent 210 may be connected to a pressure air-release valve that automatically releases accumulated gases to a facility's ventilation system.

Further, by operating ion exchange vessel 150 in up-flow, lower pressure components may be used in the liquid treatment system. More particularly, during use of prior art, down-flow systems, the incoming liquid flowing downward would cause the ion exchange media to compact. The compacted ion exchange media would create a high differential pressure across the ion exchange vessel, thus requiring use of more powerful pumps and other higher pressure components. In contrast, upward-flowing liquid does not cause compaction of ion exchange media, and thus the differential pressure across ion exchange vessel 150 may be quite lower than in the prior art.

Yet another advantage of up-flow operation relates to the radiation shielding on ion exchange vessel 150. As noted above, CST media has a tremendous capacity and high affinity for Cs and Sr. As is known, however, this tends to cause Cs removed utilizing CST media to be more concentrated in the region first encountered by the Cs-containing liquid which enters the ion exchange chamber. In other words, in a down-flow ion exchange vessel, the Cs would be concentrated in the upper portion of the ion exchange chamber because the liquid entering would flow from top to bottom. Notably, though, a greater concentration of radionuclides in one area of the vessel may require greater shielding at that location. However, including additional shielding (which may be formed of lead) at the upper portion of the ion exchange chamber may cause an ion exchange vessel to have a high center of gravity and be somewhat "top heavy." Having a higher center of gravity is undesirable for several reasons, including that it reduces the stability of the vessel during seismic events (e.g., earthquakes) and that it increases the difficulty of transporting the vessel.

In accordance with embodiments of the present invention, however, by operating ion exchange vessel 150 in up-flow, removed radionuclides will tend to concentrate at the lower portion of ion exchange chamber 153. Thus, a lower portion of ion exchange vessel 150 may have shielding of greater thickness than the upper portion of ion exchange vessel 150. For at least this reason, ion exchange vessel 150 may have a lower center of gravity and be both more stable during seismic events and easier to transport. In addition, vessel 150 may be contact-handled from the top, and because upflow operation causes the highest radiation dose rates to be nearer the bottom of vessel 150, it may also lower personnel or worker radiation exposure.

In this regard, ion exchange vessel 150 may preferably comprise upper shielding 214 and lower shielding 216. Preferably, shielding 214, 216 is formed of lead, though those of skill in the art are familiar with other suitable shielding materials. As shown in the figures, upper shielding 214 may be thinner than lower shielding 216. In one embodiment, upper shielding 214 may have an outer diameter approximately 3 in. less than that of lower shielding 216, making lower shielding 216 approximately 1.5 in. thicker on all sides. Lower shielding 216 preferably extends upward enough to adequately shield against concentrated radionuclides in the inlet mass transfer zones. In one embodiment, for example, lower shielding 216 may extend upward approximately 56.5 in. from base 160, whereas upper shielding 214, which may rest on lower shielding 216, may extend upward approximately 53.4 in. from lower shielding 216 and thus also cover some portion of upper chamber 164.

Notably, in a preferred embodiment, shielding 214 and shielding 216 may each be formed by wrapping a plurality of lead sheets around the exterior surface of outer shell 152 to the desired thickness. In one example, lead sheets having a thickness of 3/16 in. and a length of 9 ft. may be welded to each other (and, if necessary, to shell 152) to form the lead shielding. Importantly, wrapping the lead to form the shielding in this manner has several advantages. First, forming shielding 214, 216 by wrapping lead sheets makes it easier to achieve a differential shielding thickness along the length of ion exchange vessel 150. Moreover, as noted above, after the ion exchange media in vessel 150 is spent, vessel 150 may be stored for a sufficient period of time to allow radiolytic decay. By forming shielding 214, 216 of wrapped lead sheets, shielding 214, 216 may be more readily removed than prior art shielding when sufficient radiolytic decay has occurred. The lead may then be separately dispositioned as non-radioactive material. Further, in one embodiment, forming the shielding in this manner may reduce the presence of ionizing radiation by a factor of 1 million, which is significantly greater than shielding on prior art ion exchange vessels. Nonetheless, it is contemplated that shielding 214 and 216 may be formed by other methods in other embodiments, such as by pouring lead or filling a cavity with lead shot, etc.

In one embodiment, a "skin," or casing, formed of carbon steel may be secured over shielding 214, 216. (The casing is not shown in FIG. 12.) In particular, an upper lateral casing 218 may comprise a pair of steel sheets which have been plate-rolled into a semicircular shape and oppositely positioned over upper shielding 214. The longitudinal edges of each sheet may be turned outward such that when the sheets are secured over upper shielding 214, they form diametrically-opposed lips 220, 222. Likewise, a lower lateral casing 224 having lips 226, 228 may be formed in a similar fashion and secured over lower shielding 216. Lips 220, 222, 226, 228 may be secured to one another using suitable fasteners, such as bolts or the like.

In addition, an upper shelf casing 230 may be secured over the flat, shelf-like portion of upper shielding 214 which extends between riser 158 and upper lateral casing 218. Likewise, a lower shelf casing 232 may be secured over the flat, shelf-like portion of lower shielding 216 which extends between upper lateral casing 218 and lower lateral casing 224. In one embodiment, upper lateral casing 218, lower lateral casing 224, upper shelf casing 230, and lower shelf casing 232 may be approximately ⅛ in. thick.

According to a further embodiment, to provide shielding at the top portion of ion exchange vessel 150, such as with respect to riser 158, lead shot may be used. For example, upper chamber 164 in riser 158 may be filled with lead shot (indicated by arrow 234 in FIG. 12). As discussed below, this method of shielding allows air to flow upward from inner shell 194, through aperture 155 and plate cover 170, and through aperture 166 and plate cover 168. Further, inspection ports 184, 186 formed by tubing 180, 182 may also be filled with lead shot (indicated by arrow 236 in FIG. 12). A suitable cover, grating, mesh, or the like may be provided over apertures 176, 178 in middle plate 154 to support the lead shot in tubing 180, 182.

As explained above, because the ion exchange process generates large amounts of heat, it is important to ensure not just that ion exchange vessels are constructed to operate under sufficiently high temperatures, but also that sufficient cooling is provided. This may be particularly true with ion exchange using CST media for removal of Cs from liquid salt wastes, but it is also true with respect to other ion exchange media. Moreover, the high temperatures generated during ion exchange may be much higher along the centerline of the ion exchange vessel, a condition known as "excessive centerline temperature." In this regard, and as discussed below, embodiments of ion exchange vessel 150 may preferably comprise a cooling core that displaces or removes the center ion exchange media and facilitates convective air cooling. Notably, thermal analysis of an embodiment of ion exchange vessel 150 without the cooling core demonstrated that, in the absence of active cooling, ion exchange using CST media may generate centerline temperatures of over 1000° F. This temperature may increase during storage. By effectively removing the center of ion exchange vessel 150 and providing a cooling core, however, a hot spot may be eliminated. Moreover, convective air flow is facilitated such that the temperature of embodiments of ion exchange vessel 150 is much lower during both operation and storage.

Figure 13:
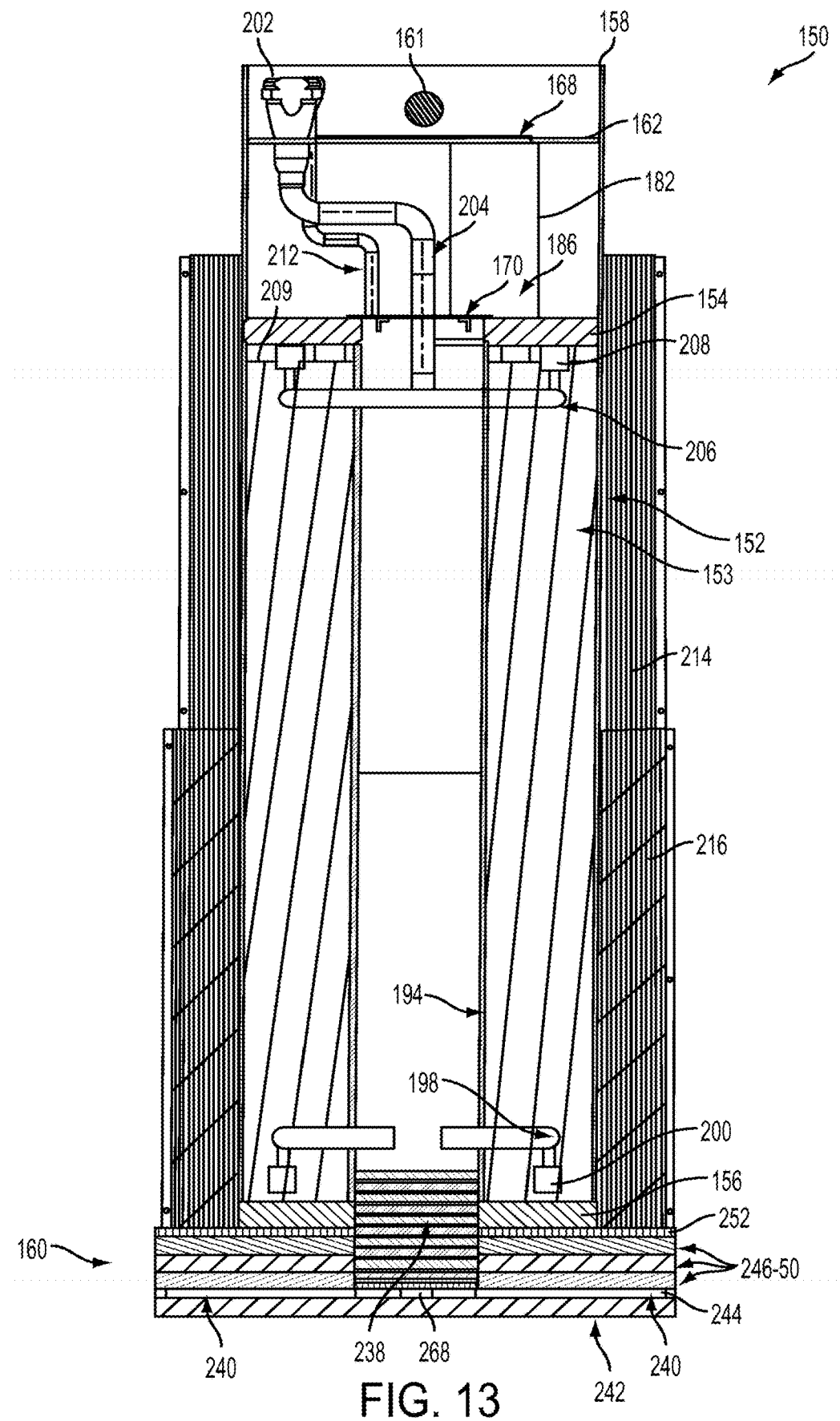
FIG. 13 is a cross-sectional view of the ion exchange vessel of FIG. 6 taken along line B-B of FIG. 8.
Figure 14:
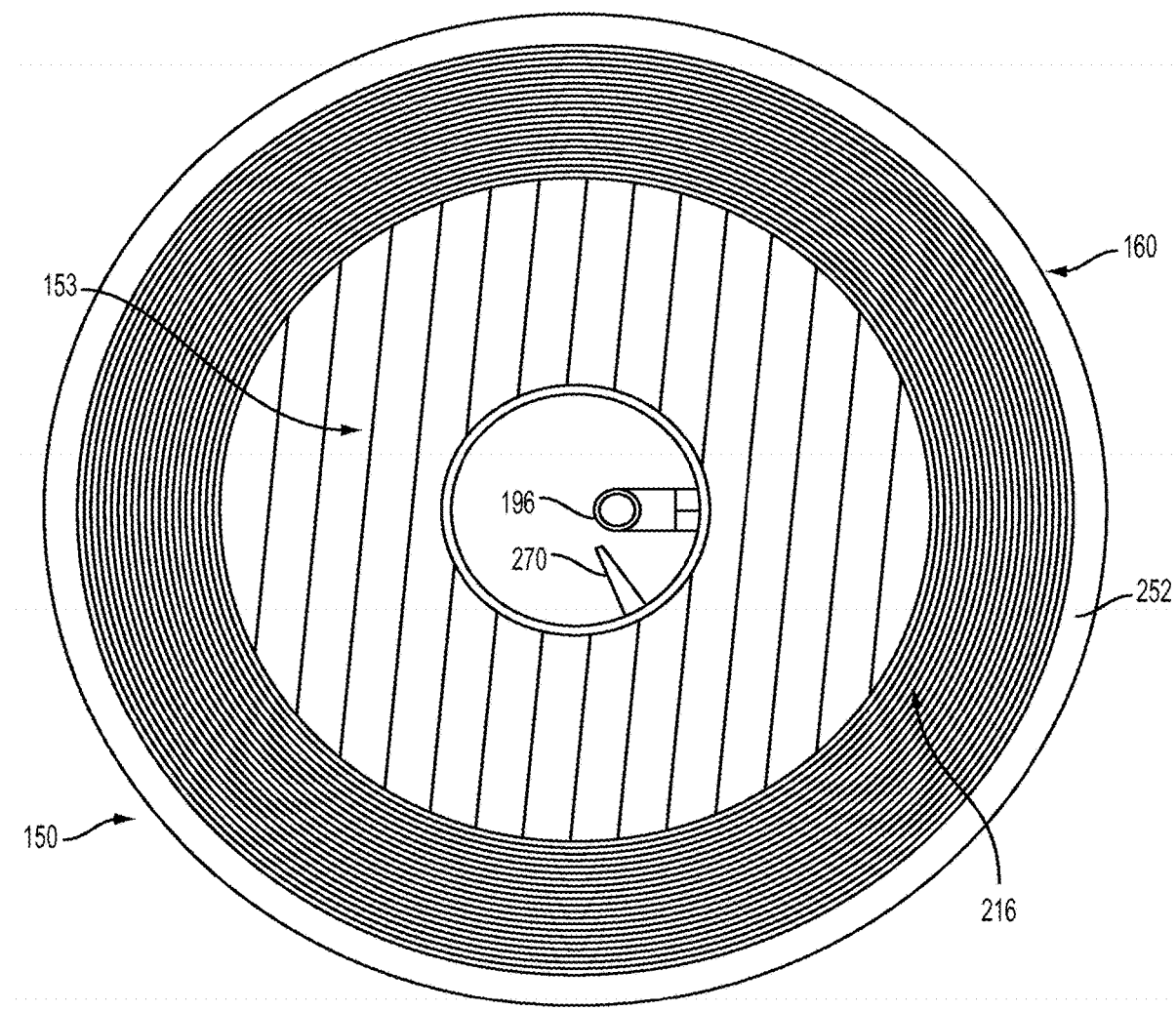
FIG. 14 is a cross-sectional view of the ion exchange vessel of FIG. 6 taken along line C-C of FIG. 7.

The cooling core of one embodiment of ion exchange vessel 150 preferably enables convective air flow along a path through base 160, through a vent shield stack 238, through inner shell 194, through aperture 155 and plate cover 170, through upper chamber 164, and ultimately exiting ion exchange vessel 150 through aperture 166 and plate cover 168. In this regard, base 160 preferably comprises at least one inlet 240 for air to pass through base 160. Inlet 240 may preferably comprise a horizontal passage extending from the outer peripheral surface of base 160 toward vent shield stack 238. In one embodiment, inlet 240 may terminate beneath vent shield stack 238, but in other embodiments inlet 240 may extend diametrically across base 160. In yet other embodiments, more than one inlet 240 may be provided. As shown in FIG. 13, for example, the illustrated embodiment of ion exchange vessel 150 may comprise two inlets 240.

In a preferred embodiment, base 160 may comprise a plurality of metal plates. As illustrated, for example, base 160 may comprise six plates 242, 244, 246, 248, 250, and 252. Plates 242-52 may be arranged in a concentric, stacked formation and suitably fixed to one another (e.g., by welding) to provide a cylindrical support structure for ion exchange vessel 150. In one embodiment, base 160 may be approximately 10 in. tall when plates 242-52 are stacked together.

More particularly, plate 242 may preferably be circular in shape and formed of carbon steel. In one embodiment, plate 242 may be approximately 2 in. thick. Plates 246-52 may also be circular in shape and formed of carbon steel. In one embodiment, plates 246-50 may each be approximately 2 in. thick, whereas plate 252 may be approximately 1 in. thick. However, those of skill in the art may select suitable dimensions for the plates which comprise base 160 based on needed or desired support and shielding for ion exchange vessel 150.

Unlike plate 242, plates 246-52 may preferably each define a central aperture, which in one embodiment may be circular in shape. It is preferred that the central apertures of plates 246-52 have the same diameter, which may be substantially equal to the inner diameter of inner shell 194. Thus, when plates 246-52 are stacked together, the central apertures form a hole 254 over plate 244. The depth of hole 254 may be defined by the thickness of plates 246-52.

In a preferred embodiment, plates 242 and 246-52 may have an outer diameter that is substantially equal. For example, the outer diameter of these plates may be approximately 55 in. In any event, the outer diameter of plates 242 and 246-52 is preferably greater than that of lower shielding 216. As explained above, this may further contribute to the stability, ease of transport, and lower center of gravity of ion exchange vessel 150.

Figure 11:
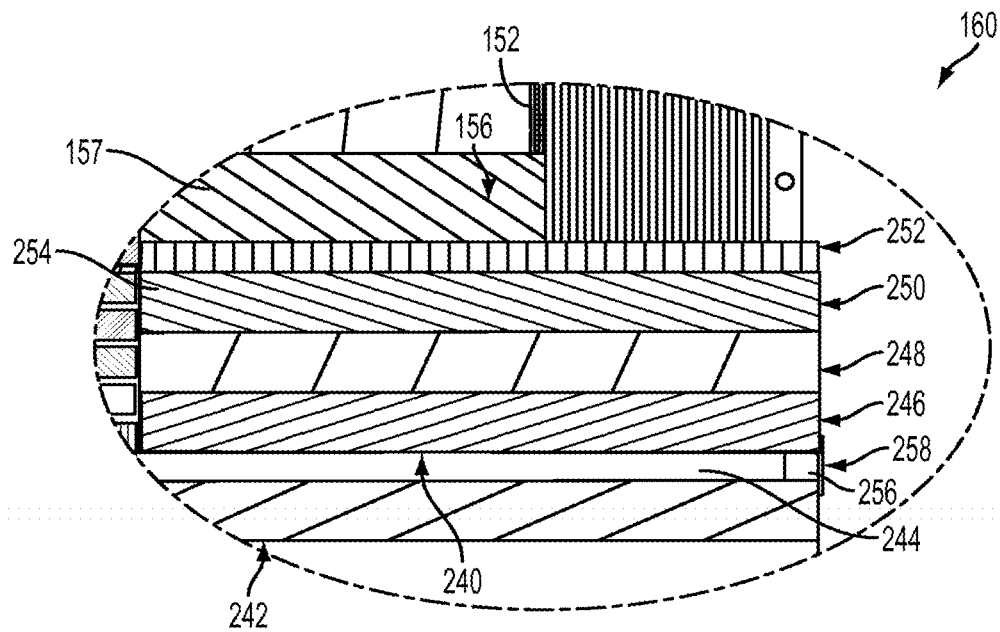
FIG. 11 is a cross-sectional detail view of the interface between the ion exchange chamber, lower plate, and base of the ion exchange vessel of FIG. 6.
Figure 12:
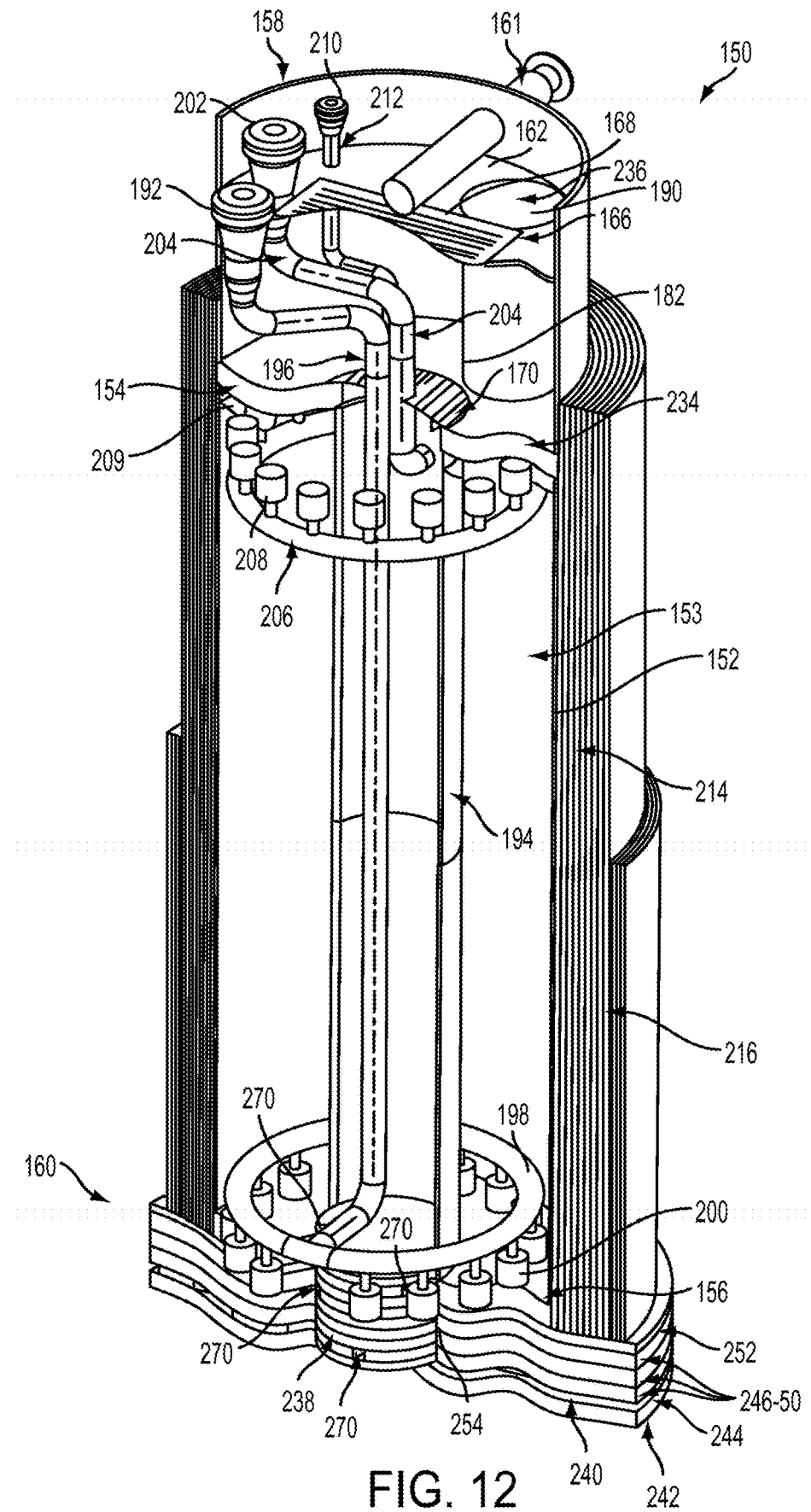
FIG. 12 is an isometric view of the ion exchange vessel of FIG. 6, with portions cut away.
Figure 15:
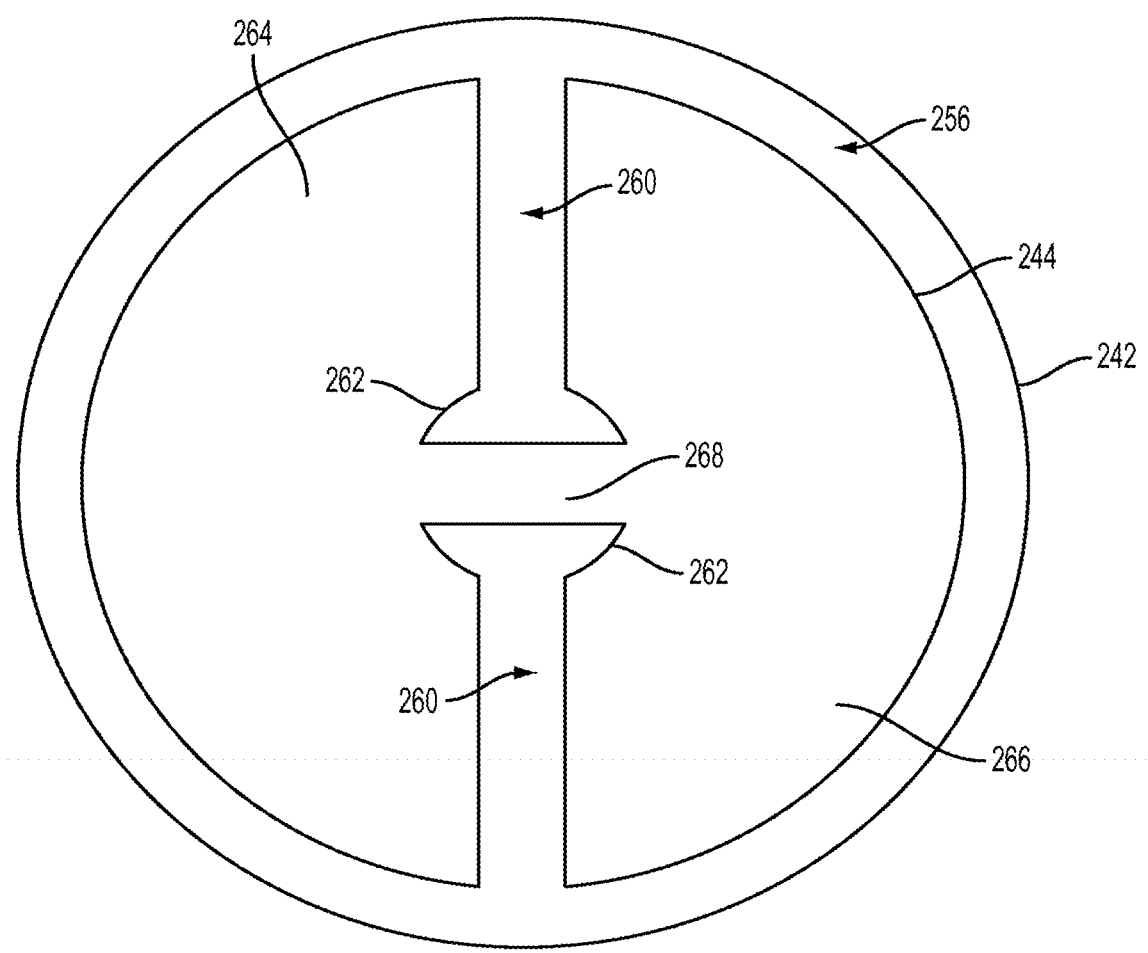
FIG. 15 is a cross sectional view of the ion exchange vessel of FIG. 6 taken along line D-D of FIG. 7.

However, as shown in FIGS. 11 & 15, plate 244 may preferably have an outer diameter that is slightly smaller than the outer diameter of plates 242 and 246-52. In one embodiment, for example, the outer diameter of plate 244 may be approximately 53 in. Accordingly, when plates 242-52 are stacked together, base 160 may define a peripheral groove 256. Air may enter the cooling core of ion exchange vessel 150 at groove 256, and thus in one embodiment a screen 258 may be affixed over groove 256, for example to prevent the entry of insects, debris, or the like. Screen 258, which may be annular in shape and extend around the periphery of base 160, may be formed of 5 mesh stainless steel, for example.

In the illustrated embodiment, inlet 240 in base 160 may be defined by plates 242, 244, and 246. More specifically, as shown in FIG. 15, plate 244 may be substantially circular in shape but may have at least one slot 260 defined therethrough. In one embodiment, slot 260 may be generally rectangular in shape, with a semicircular distal end 262, though slot 260 may take any suitable shape in other embodiments. For example, it will be appreciated that the width of slot 260 may vary depending on the amount of air flow needed or desired through inlet 240. Slot 260 may preferably extend radially from the peripheral edge of plate 244, terminating short of the center of plate 244. In this regard, the length of slot 260 is preferably defined such that slot 260 terminates in a position which will be beneath hole 254 defined by plates 246-52.

Here, two slots 260 are defined in plate 244, such that plate 244 may comprise a first half 264 and a second half 266 connected by a rectangular portion 268. In other embodiments, however, a single slot 260 or more than two slots 260 may be provided. In any event, because slots 260 extend through the thickness of plate 244, when plates 242, 244, and 246 are stacked together, inlets 240 are defined.

It will be appreciated that constructing base 160 out of a plurality of metal plates may facilitate manufacture of base 160. Still, in other embodiments, base 160 may comprise fewer than or more than six plates. Indeed, it is contemplated that base 160 may comprise a single, metal plate that is circular in shape and has at least one inlet 240 defined therein.

After air enters base 160 through one or more inlets 240, it may encounter vent shield stack 238, as noted above. In one embodiment, vent shield stack 238 may comprise a single metal cylinder having an air passage defined therethrough. In a preferred embodiment, however, and as with base 160, vent shield stack 238 may comprise a plurality of plates arranged in a concentric, stacked formation. As shown, vent shield stack 238 may comprise 11 such plates, though fewer or more than this number of plates may be provided in other embodiments. The plates of vent shield stack 238 are preferably formed of carbon steel and may each be approximately 1 in. think in one embodiment. Further, the plates of vent shield stack 238 may be circular in shape, be substantially equal in dimension, and have diameters which are slightly less than the inner diameter of inner shell 194. Thus, the plates of vent shield stack 238 may form a cylindrical structure which may be received in hole 254 (over plate 244) and which may extend upward into inner shell 194.

To allow air entering inlet(s) 240 to pass upward into inner shell 194, at least one radial slot 270 may be defined in each of the plates of vent shield stack 238. As shown in FIGS. 9 and 11-14, slots 270 may be angularly offset in one embodiment, though this is not required. For example, the plates of vent shield stack 238 may preferably be stacked such that slots 270 are angularly offset but at least partially overlap. Thus, air may flow upward between the plates of vent shield stack 238 in a stair-step fashion from one plate to the next. Accordingly, vent shield stack 238 may provide additional shielding beneath inner shell 194 while still allowing air entering inlet(s) 240 to pass through each plate of vent shield stack 238 and into inner shell 194.

Finally, one embodiment of ion exchange vessel 150 may have the following approximate specifications. The overall height of the vessel may be approximately 143 in., and its outer diameter may be approximately 55 in. The ion exchange media cavity height may be approximately 108 in., and the ion exchange media bed height may be approximately 96 in. The ion exchange media cavity volume may be approximately 100,000 in$^3$, and the volume of loaded ion exchange media may be approximately 2 to 5% less than the media cavity volume. The upper shielding 214 may be approximately 5.44 in. thick, whereas the lower shielding 216 may be approximately 6.94 in. thick. Also, the empty weight of the vessel (excluding the ion exchange media and lead shot) may be approximately 51688 lbs. The maximum operating weight of the vessel may be approximately 61717 lbs (60502 lbs excluding water). Further, the design operating pressure of the vessel may be approximately 1.37 MPa (199 PSIG). The design operating temperature of the vessel may be 66° C. (150.8° F.).

Embodiments of the present invention provide a process and method for treatment of radioactive liquid having high levels of certain radionuclides. While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A vessel for removing radionuclides from a liquid that flows through the vessel, said vessel being constructed as a pressure vessel comprising:
    a shielded housing comprising an outer shell and an inner shell disposed within said outer shell, said housing defining an ion exchange chamber between said inner and outer shells, said housing having a shielding that inhibits escape of radiation from the ion exchange chamber;
    an inlet diffuser located inside said ion exchange chamber;
    an outlet collection structure located inside said ion exchange chamber;
    a base supporting said housing;
    a process inlet in fluid communication with said inlet diffuser;
    a process outlet in fluid communication with said outlet collection structure; and
    a first fluid passage extending between an exterior of said vessel and said inner shell and a second fluid passage extending between the exterior of said vessel and said inner shell,
    wherein said vessel permits convective air flow between said first fluid passage, said inner shell, and said second fluid passage.

2. The vessel of claim 1, wherein said inlet diffuser is located proximate a bottom of said ion exchange chamber and said outlet collection structure is located proximate a top of said ion exchange chamber.

3. The vessel of claim 1, wherein said housing further comprises a riser defining an upper chamber therein.

4. The vessel of claim 3, wherein said upper chamber is filled with lead shot.

5. The vessel of claim 1, wherein said housing is shielded by a plurality of lead sheets wrapped around an outer surface of said housing.

6. The vessel of claim 1, wherein said first fluid passage extends through said base.

7. The vessel of claim 6, said base comprising a plurality of stacked base plates arranged horizontally, wherein at least one of said stacked base plates is a slotted base plate defining at least one slot forming part of the first fluid passage.

8. The vessel of claim 7, further comprising a vent shield stack disposed along said first fluid passage.

9. The vessel of claim 7, wherein at least one of said stacked base plates defines a central aperture axially aligned with an interior of said inner shell.

10. The vessel of claim 9, wherein multiple of said stacked base plates each define a respective said central aperture which collectively define a base hole axially aligned with an interior of said inner shell.

11. The vessel of claim 10, further comprising a vent shield stack disposed along said first fluid passage, said vent shield stack comprising a plurality of stacked vent shield plates located in said base hole.

12. The vessel of claim 11, wherein said vent shield plates define respective radial slots forming part of said first fluid passage.

13. The vessel of claim 12, wherein said radial slots of respective ones of said vent shield stacks are angularly offset but partially overlap.

14. The vessel of claim 7, wherein said slotted base plate is positioned on top of an imperforate bottom plate and another one of the plurality of base plates is positioned on top of said slotted base plate.

15. The vessel of claim 14, wherein said slotted base plate has a plurality of slots that form part of the first fluid passage.

16. The vessel of claim 15, wherein said slotted plate has a diameter less than that of the bottom plate and the another one of the plurality of base plates to define an annular groove around the base.

\* \* \* \* \*